(12) United States Patent
Lim et al.

(10) Patent No.: US 11,051,041 B2
(45) Date of Patent: *Jun. 29, 2021

(54) METHOD FOR ENCODING/DECODING IMAGE AND DEVICE THEREOF

(71) Applicant: LG Electronics Inc., Seoul (KR)

(72) Inventors: Jaehyun Lim, Seoul (KR); Seungwook Park, Seoul (KR); Yongjoon Jeon, Seoul (KR); Chulkeun Kim, Seoul (KR); Jungsun Kim, Seoul (KR); Naeri Park, Seoul (KR); Hendry Hendry, Seoul (KR); Byeongmoon Jeon, Seoul (KR); Joonyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

This patent is subject to a terminal disclaimer.

(21) Appl. No.: 16/534,693

(22) Filed: Aug. 7, 2019

(65) Prior Publication Data

US 2019/0364299 A1    Nov. 28, 2019

Related U.S. Application Data

(63) Continuation of application No. 15/923,740, filed on Mar. 16, 2018, now Pat. No. 10,425,660, which is a
(Continued)

(51) Int. Cl.
*H04N 19/61*   (2014.01)
*H04N 19/86*   (2014.01)
(Continued)

(52) U.S. Cl.
CPC .......... *H04N 19/61* (2014.11); *H04N 19/124* (2014.11); *H04N 19/13* (2014.11); *H04N 19/82* (2014.11);
(Continued)

(58) Field of Classification Search
CPC ...... H04N 19/61; H04N 19/124; H04N 19/13; H04N 19/82; H04N 19/86; H04N 19/176; H04N 19/182
See application file for complete search history.

(56) References Cited

U.S. PATENT DOCUMENTS 5,675,703 A * 10/1997 Sato .................. G10L 19/16
370/477
5,758,347 A *  5/1998 Lo ..................... G06F 16/00
(Continued)

FOREIGN PATENT DOCUMENTS

KR    1020100040479    4/2010
KR    1020100101693    9/2010
KR    1020100136391    12/2010

*Primary Examiner* — Joseph Suh
(74) *Attorney, Agent, or Firm* — Dentons US LLP

(57) ABSTRACT

A method for image decoding, according to the present invention, includes the following steps: receiving image information including a plurality of filter coefficients; generating a restored block for a current block on the basis of the image information; and applying an adaptive loop filter to the restored block on the basis of the plurality of filter coefficients. According to the present invention, image encoding efficiency may be improved, and complexity may be reduced.

17 Claims, 38 Drawing Sheets

Related U.S. Application Data continuation of application No. 15/263,717, filed on Sep. 13, 2016, now Pat. No. 9,948,954, which is a continuation of application No. 14/345,599, filed as application No. PCT/KR2012/007087 on Sep. 5, 2012, now Pat. No. 9,485,521.

(60) Provisional application No. 61/536,553, filed on Sep. 19, 2011, provisional application No. 61/537,581, filed on Sep. 22, 2011, provisional application No. 61/549,758, filed on Oct. 21, 2011.

(51) Int. Cl.
  *H04N 19/82* (2014.01)
  *H04N 19/124* (2014.01)
  *H04N 19/13* (2014.01)
  *H04N 19/176* (2014.01)
  *H04N 19/182* (2014.01)

(52) U.S. Cl.
  CPC ........... *H04N 19/86* (2014.11); *H04N 19/176* (2014.11); *H04N 19/182* (2014.11)

(56) References Cited

U.S. PATENT DOCUMENTS

| | | | | |
|---|---|---|---|---|
| 2005/0254663 | A1* | 11/2005 | Raptopoulos | G10K 11/175 381/71.1 |
| 2008/0216066 | A1* | 9/2008 | Oh | G06F 8/658 717/173 |
| 2009/0010323 | A1* | 1/2009 | Su | H04N 19/597 375/240.01 |
| 2009/0306994 | A1* | 12/2009 | Chon | G10L 19/167 704/500 |
| 2010/0322526 | A1* | 12/2010 | Lee | H04N 19/146 382/232 |
| 2012/0016667 | A1* | 1/2012 | Gao | G10L 19/022 704/203 |
| 2012/0177107 | A1* | 7/2012 | Fu | H04N 19/167 375/240.03 |
| 2013/0114686 | A1* | 5/2013 | Misra | H04N 19/52 375/240.03 |
| 2013/0182759 | A1* | 7/2013 | Kim | H04N 19/86 375/240.02 |

* cited by examiner

1-D 0-degree

1-D 90-degree

1-D 135-degree

1-D 90-degree

FIG. 14E

| Category | Condition |
|---|---|
| 1 | c<2 neighboring pixels |
| 2 | c<1 neighbor && c==1 neighbor |
| 3 | c>1 neighbor && c==1 neighbor |
| 4 | c>2 neighbors |
| 0 | None of the above |

0 degree 90 degree 135 degree 45 degree

1-D 0-degree

1-D 90-degree

1-D 135-degree

1-D 90-degree mixed EO

FIG. 19F

| Category | Condition |
|---|---|
| 1 | c<2 neighboring pixels |
| 2 | c<1 neighbor && c==1 neighbor |
| 3 | c>1 neighbor && c==1 neighbor |
| 4 | c>2 neighbors |
| 0 | None of the above |

FIG. 19G

| Category for mixed EO | Condition | EO type |
|---|---|---|
| 1 | c<2 neighboring pixels | X-degree |
| 2 | c<1 neighbor && c==1 neighbor | |
| 3 | c>1 neighbor && c==1 neighbor | |
| 4 | c>2 neighbors | |
| 5 | c<2 neighboring pixels | Y-degree |
| 6 | c<1 neighbor && c==1 neighbor | |
| 7 | c>1 neighbor && c==1 neighbor | |
| 8 | c>2 neighbors | |
| 0 | else | |

BQSquare test sequence

Luma original pictures of areas A and B and
histogram difference between recon picture histogram chroma (Cr) original pictures of areas A and B and
histogram difference between recon picture histogram chroma (Cb) original pictures of areas A and B and
histogram difference between recon picture histogram

METHOD FOR ENCODING/DECODING IMAGE AND DEVICE THEREOF

This application is a continuation of application Ser. No. 15/923,740 filed Mar. 16, 2018, now allowed, which is a continuation of Ser. No. 15/263,717 filed Sep. 13, 2016, now U.S. Pat. No. 9,948,954, issued Apr. 17, 2018, which is a continuation of Ser. No. 14/345,599 filed May 28, 2014, now U.S. Pat. No. 9,485,521, issued Nov. 1, 2016, which claims the benefit of priority of PCT/KR2012/007087 filed on Sep. 5, 2012, U.S. Provisional Application No. 61/536,553 filed on Sep. 19, 2011, U.S. Provisional Application No. 61/537,581, filed Sep. 22, 2011, and U.S. Provisional Application No. 61/549,758 filed on Oct. 21, 2011, all of which are incorporated by reference in their entirety herein.

TECHNICAL FIELD

Discussion of Related Art

Demand for high-resolution, high-quality images such as HD (high definition) or UHD (ultra high definition) images is recently on the rise in various fields. As image data has higher resolution and higher quality, the amount of information or bits transferred is relatively increased as compared with existing image data. Accordingly, when image data is delivered using media such as existing wired/wireless broadband lines or stored in conventional storage media, costs for transmission and storage are increased. To address such issues, high-efficiency image compression techniques may be adopted.

Among the image compression techniques are inter prediction for predicting a pixel value included in a current picture from a previous and/or subsequent picture of the current picture, intra prediction for predicting a pixel value included in a current picture using information on a pixel in the current picture, and entropy encoding that assigns a shorter codeword to a more frequent value while assigning a longer codeword to a less frequent value. Use of such image compression techniques enables image data to be efficiently compressed, transferred, or stored.

SUMMARY

Objects

An object of the present invention is to provide an image encoding method and apparatus that may enhance image encoding efficiency and reduce complexity.

Another object of the present invention is to provide an image decoding method and apparatus that may enhance image encoding efficiency and reduce complexity.

Still another object of the present invention is to provide an adaptive loop filtering method and apparatus that may enhance image encoding efficiency and reduce complexity.

Solution

An embodiment of the present invention provides a method of decoding an image. The method comprises receiving image information including a plurality of filter coefficients; generating a reconstructed block for a current block based on the image information; and applying an adaptive loop filter to the reconstructed block based on the plurality of filter coefficients, wherein the adaptive loop filter has a fixed filter shape, and wherein the plurality of filter coefficients are allotted to the adaptive loop filter in the form of central symmetry depending on the filter shape.

An adaptive loop filter applied to a luma component of the reconstructed block and an adaptive loop filter applied to a chroma component of the reconstructed block may have the same filter shape.

The filter shape of the adaptive loop filter may have a center square and a cross overlapping each other, wherein the center square has a square shape with respect to a center filter tab, and the cross may have a cross shape with central symmetry with respect to the center filter tab, and wherein the center filter tab is a filter tab to which a filter coefficient positioned at the center of the filter shape is assigned.

A vertical size of the cross may be larger than a vertical size of the center square, and a horizontal size of the cross may be larger than a horizontal size of the center square.

The center square may be a 3×3 center square having a size of 3×3, and the horizontal size and the vertical size of the cross may be 5 or more.

The filter shape of the adaptive loop filter may have a 3×3 center square and a 9×5 cross overlapping each other, wherein the 3×3 center square may be shaped as a 3×3-size square with respect to the center filter tab, and wherein the 9×5 cross may be shaped as a cross having a central symmetrical structure with respect to the center filter tab, and wherein a horizontal size of the cross may be 9, and a vertical size of the cross may be 5.

The filter shape of the adaptive loop filter may have a 3×3 center square and a 9×7 cross overlapping each other, wherein the 3×3 center square may be shaped as a 3×3-size square with respect to the center filter tab, and wherein the 9×7 cross may be shaped as a cross having a central symmetrical structure with respect to the center filter tab, and wherein a horizontal size of the cross may be 9, and a vertical size of the cross may be 7.

Another embodiment of the present invention provides an apparatus of decoding an image. The apparatus comprises a receiving module receiving image information including a plurality of filter coefficients; a reconstructed block generating module generating a reconstructed block for a current block based on the image information; and a filtering module applying an adaptive loop filter to the reconstructed block based on the plurality of filter coefficients, wherein the adaptive loop filter has a fixed filter shape, and wherein the plurality of filter coefficients are allotted to the adaptive loop filter in the form of central symmetry depending on the filter shape.

An adaptive loop filter applied to a luma component of the reconstructed block and an adaptive loop filter applied to a chroma component of the reconstructed block may have the same filter shape.

The filter shape of the adaptive loop filter may have a center square and a cross overlapping each other, wherein the center square may have a square shape with respect to a center filter tab, and the cross may have a cross shape with central symmetry with respect to the center filter tab, and wherein the center filter tab may be a filter tab to which a filter coefficient positioned at the center of the filter shape is assigned.

A vertical size of the cross may be larger than a vertical size of the center square, and a horizontal size of the cross may be larger than a horizontal size of the center square.

The center square may be a 3×3 center square having a size of 3×3, and the horizontal size and the vertical size of the cross may be 5 or more.

The filter shape of the adaptive loop filter may have a 3×3 center square and a 9×5 cross overlapping each other, wherein the 3×3 center square may be shaped as a 3×3-size square with respect to the center filter tab, and wherein the 9×5 cross may be shaped as a cross having a central symmetrical structure with respect to the center filter tab, and wherein a horizontal size of the cross may be 9, and a vertical size of the cross may be 5.

The filter shape of the adaptive loop filter may have a 3×3 center square and a 9×7 cross overlapping each other, wherein the 3×3 center square may be shaped as a 3×3-size square with respect to the center filter tab, and wherein the 9×7 cross may be shaped as a cross having a central symmetrical structure with respect to the center filter tab, and wherein a horizontal size of the cross may be 9, and a vertical size of the cross may be 7.

Effects

According to the present invention, an image encoding method may enhance image encoding efficiency and reduce complexity.

According to the present invention, an image decoding method may enhance image encoding efficiency and reduce complexity.

According to the present invention, an adaptive loop filtering method may enhance image encoding efficiency and reduce complexity.

BRIEF DESCRIPTION OF DRAWINGS

FIGS. 14(a)-14(e) illustrate direction and category of edge offset according to an embodiment of the present invention.

FIGS. 19(a)-g) illustrate direction and category of edge offset according to another embodiment of the present invention.

DETAILED DESCRIPTION OF EMBODIMENTS

Figure 1:
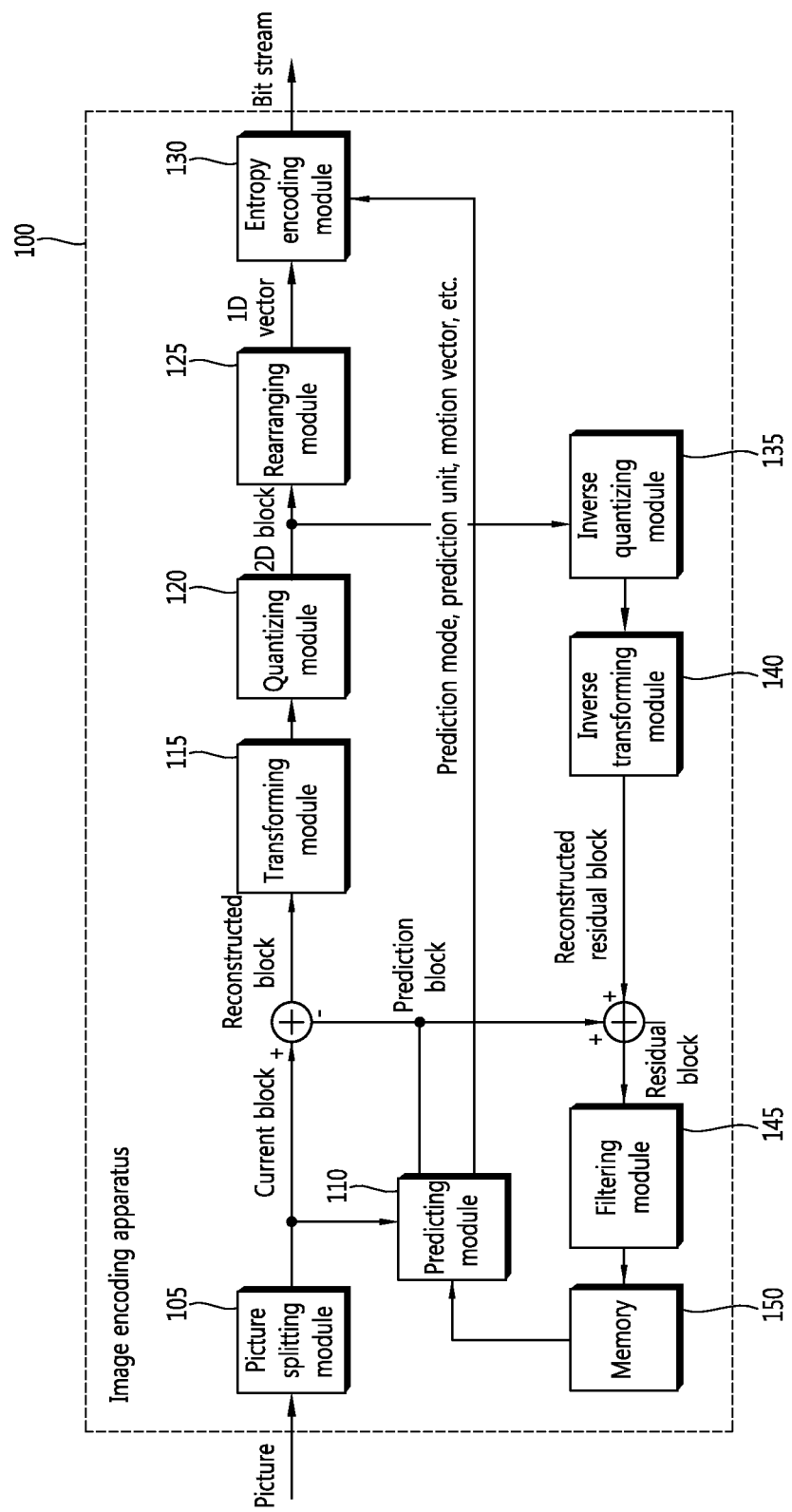
FIG. 1 is a block diagram schematically illustrating an image encoding apparatus according to an embodiment of the present invention.

Various changes may be made to the present invention, and the present invention may have various embodiments. Specific embodiments are described in detail with reference to the accompanying drawings. However, the present invention is not limited to the embodiments. The terms used herein are used for the illustrative purposes and are not intended to limit the present invention. A singular term includes a plural term unless otherwise stated. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Meanwhile, the elements in the drawings are shown independently for ease of description on the different features from each other and should not be construed as meaning that the elements are implemented in separate pieces of hardware or software. For example, among the elements, two or more may be combined to configure a single element, and any one element may be divided into multiple elements. Embodiments where the elements are combined and/or each element is divided belong to the scope of the present invention without departing from the gist of the present invention.

Some elements are not essential ones to perform the inevitable functions of the present invention but rather may be optional elements to enhance performance. The present invention may be implemented only by the elements necessary for realizing the gist of the invention or such a configuration that includes only the essential elements excluding the optional elements used for enhancing performance may also be included in the scope of the present invention.

Hereinafter, preferred embodiments of the present invention are described in detail with reference to the drawings. The same reference numerals refer to the same elements and the repetitive description on the same elements is omitted.

FIG. 1 is a block diagram schematically illustrating an image encoding apparatus according to an embodiment of the present invention. Referring to FIG. 1, the image encoding apparatus 100 includes a picture splitting module 105, a predicting module 110, a transforming module 115, a quantizing module 120, a rearranging module 125, an entropy encoding module 130, an inverse-quantizing module 135, an inverse-transforming module 140, a filtering module 145, and a memory 150.

The picture splitting module 105 may split the input picture to at least one unit of processing. At this time, the unit of processing may be a prediction unit (PU), a transform unit (TU), or a coding unit (CU).

The coding unit (CU) may mean a unit for performing encoding/decoding on a picture. One coding block in an encoding target picture has a depth based on a quad tree structure and may be repeatedly split. At this time, a coding block that is not subjected to any more splitting may correspond to the coding unit, and an encoder may perform an encoding process on the coding unit. The coding unit may have various sizes of 64×64, 32×32, 16×16, and 8×8.

Here, the coding block that is repeatedly split based on the quad tree structure may be referred to as a coding tree block (CTB). One coding tree block might not be split any more, and in such case, the coding tree block itself may correspond to one coding unit.

One coding unit may be split into a plurality of prediction units and/or a plurality of transform units. Hereinafter, the "unit" may also be referred to as a "block" in some cases.

The predicting module 110 may include an inter predicting unit for performing inter prediction and an intra predicting unit for performing intra prediction. The predicting module 110 may generate a prediction block by performing prediction on a unit of processing a picture. The unit of processing a picture in the predicting module 110 may be a coding unit or a transform unit, or a prediction unit. Further, whether the prediction run on a corresponding unit of processing is inter prediction or intra prediction may be determined, and details of each predicting method (for example, prediction mode) may be determined. At this time, the unit of processing, by which prediction is performed, may differ from the unit of processing, by which a predicting method and details are determined. For example, a predicting method and a predicting mode may be determined on a per-prediction unit basis, and prediction may be performed on a per-transform unit basis. A residual value (residual block) between a generated prediction block and an original block may be input to the transforming module 115.

The predicting module 110 may perform inter prediction and/or intra prediction. In case inter prediction is performed, the predicting module 110 may perform prediction based on information on at least one picture among a previous or subsequent picture of a current picture to generate a prediction block. In case intra prediction is performed, the predicting module 110 may generate a prediction block by performing prediction based on information on a pixel in the current picture. At this time, the prediction mode information or motion vector information used for prediction, together with the residual value, may be encoded in the entropy encoding module 130 and may be then delivered to the decoder.

The transforming module 115 performs transform on a residual block on a per-unit of transform basis to generate a transform coefficient. The unit of transform in the transforming module 115 may be a transform unit and may have a quad tree structure. At this time, the size of the unit of transform may be determined in a range of a predetermined maximum value and minimum value. The transforming module 115 may transform the residual block using DCT (discrete cosine transform) and/or DST (discrete sine transform).

The quantizing module 120 may quantize the residual values transformed in the transforming module 115 to generate quantized coefficients. The value produced from the quantizing module 120 may be provided to the inverse-quantizing module 135 and the rearranging module 125.

The rearranging module 125 may rearrange the quantized coefficients provided from the quantizing module 120. By rearranging the quantized coefficients, the encoding efficiency in the entropy encoding module 130 may be increased. The rearranging module 125 may rearrange quantized coefficients of a 2-dimensional block in the form of a 1-dimensional vector. The rearranging module 125 changes the order of coefficient scanning based on stochastic statistics of the coefficients transferred from the quantizing module 120, thereby able to raise the entropy encoding efficiency in the entropy encoding module 130.

The entropy encoding module 130 may perform entropy encoding on the quantized coefficients rearranged by the rearranging module 125. The entropy encoding module 130 may encode various pieces of information such as filtering information, block interpolation information, reference picture information, motion vector information, prediction unit information and transmission unit information, split unit information, prediction mode information, block type information, and the quantized coefficient information on the coding unit delivered from the rearranging module 125 and the predicting module 110.

For entropy encoding, various methods may be used including Exponential Golomb, CAVLC (Context-Adaptive Variable Length Coding), and/or CABAC (Context-Adaptive Binary Arithmetic Coding). For example, the entropy encoding module 130 may store a table for performing entropy encoding such as a variable length coding (hereinafter, "VLC") table, and the entropy encoding module 130 may perform entropy encoding using the stored VLC table. In the CABAC entropy encoding, as another example, the entropy encoding module 130 may change a symbol into a binary value thereby turning into a bin, and may then perform arithmetic encoding on the bin according to the likeliness of occurrence of the bin, thereby generating a bit stream.

In case entropy encoding applies, a lower value of index and its corresponding shorter codeword may be assigned to a symbol having a higher chance of occurrence, while a higher value of index and its corresponding longer codeword may be assigned to a symbol having a lower chance of occurrence. Accordingly, the bit count on the symbols targeted for encoding may be reduced, and image compression performance may be enhanced by entropy encoding.

The inverse-quantizing module 135 may inverse-quantize the values quantized by the quantizing module 120, and the inverse-transforming module 140 may inverse-transform the inverse-quantized values. The residual values generated in the inverse-quantizing module 135 and the inverse-transforming module 140 are added to the prediction block predicted by the predicting module 110, thus generating a reconstructed block.

The filtering module 145 may apply an in-loop filter to the reconstructed block and/or picture. The in-loop filter may include a deblocking filter, an SAO (sample adaptive offset) and/or adaptive loop filter (ALF).

The memory 150 may store the reconstructed block or picture produced through the filtering module 145. The reconstructed block or picture stored in the memory 150 may be provided to the predicting module 110 that performs inter prediction.

Figure 2:
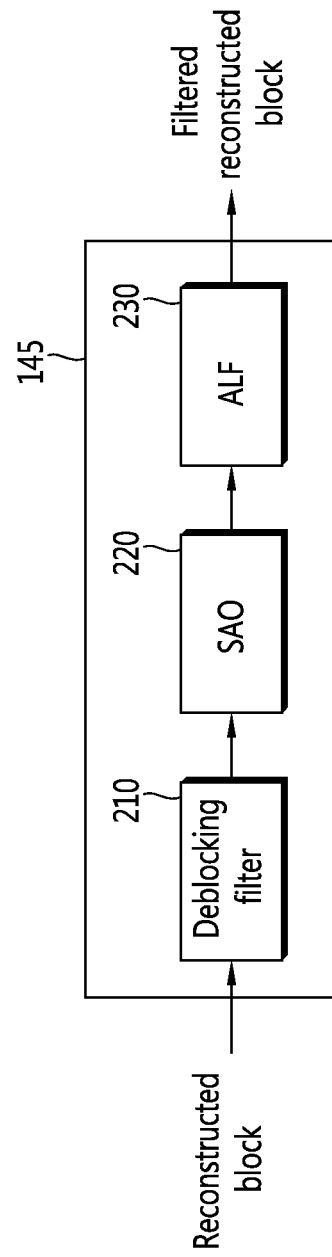
FIG. 2 is a block diagram schematically illustrating a filtering module according to an embodiment of the present invention.

FIG. 2 is a block diagram schematically illustrating a filtering module according to an embodiment of the present invention. referring to FIG. 2, the filtering module 145 may include a deblocking filter 210, an SAO 220, and/or an adaptive loop filter (ALF) 230.

As described in detail in connection with FIG. 1, to compensate for a difference between the original image and reconstructed image due to errors that occur during compression encoding including quantization, the in-loop filter may apply to the reconstructed image. As described earlier, in-loop filtering may be carried out by the filtering module 145 upon encoding, and the filtering module 145 may apply one or more of the deblocking filter 210, the SAO 220, and the adaptive loop filter 230 to the reconstructed image.

The deblocking filter 210 may remove block distortions that are generated at the boundary between blocks in the reconstructed picture. As described above, the encoder may reconstruct an image on a per-block basis. In case image reconstruction is carried out on a per-block basis, a block distortion may arise at the boundary between blocks in the reconstructed picture. Accordingly, the encoder, in order to eliminate the block distortion at the inter-block boundary, may use the deblocking filter 210. A deblocking filtering process may be applicable to all the prediction unit edges and transform unit edges in the picture, and the deblocking filter 210 may set a transform unit boundary and prediction unit boundary that are to be applied with the deblocking filter 210.

Specifically, the deblocking filter 210 may determine a bS (boundary strength) on the inter-block boundary and/or block edge based on the transform unit boundary and prediction unit boundary. Here, bS may mean the strength of a boundary between blocks.

If the bS is determined, the deblocking filter 210 may determine whether to perform filtering. Assuming that a bS value for the boundary (block edge) between block P and block Q is derived, the deblocking filter 210 may determine whether to perform filtering based on what degree of linearity a predetermined sample line in block P and a predetermined sample line in block Q occur with respect to the boundary. Further, the deblocking filter 210 may determine that no filtering is performed on a pixel in a block encoded in I_PCM mode. As will be described below, the encoder, in I_PCM mode, does not perform, e.g., prediction, transform, and/or quantization and may rather send the pixel values in the current CU, as they are, to the decoder. Accordingly, the I_PCM mode requires the deblocking filtering process to be skipped. At this time, the encoder may send to the decoder information as to whether the current CU has been I_PCM encoded.

Since in the step of determining whether to perform filtering no filtering may be determined to be performed, the filtering module 145 might not perform deblocking filtering on the inter-block boundary and/or block edge. In case filtering is determined to be performed, the deblocking filter 210 may determine a filter (hard filter or light filter) that is to be applied to the inter-block boundary and/or block edge based on the determined bS value and may perform deblocking filtering on the inter-block boundary and/or block edge based on the determined filter.

Meanwhile, as described above, the filtering module 145 may adopt the SAO 220 as the in-loop filter. By way of example, the SAO 220 may be positioned behind the deblocking filter 210. Accordingly, in case no deblocking filtering is performed on the reconstructed block, the SAO 220 may be applied to the reconstructed block (and/or reconstructed slice and/or reconstructed picture) itself input to the filtering module 145, and in case deblocking filtering is performed on the reconstructed block (and/or reconstructed slice and/or reconstructed picture), the SAD 220 may be applied to the reconstructed block (and/or reconstructed slice and/or reconstructed picture) that has undergone filtering.

An SAO process may correspond to another in-loop filtering process that compensates, on a per-pixel basis, for an offset difference from the original image on an image that has been subjected to deblocking filtering. The SAO makes up for a coding error, which may come from, e.g., quantization. The SAO may have two types, one band offset, and the other edge offset.

When the SAO 220 applies, no SAO process may be performed on a pixel in a block encoded in I_PCM mode. Further, the SAO 220 may adaptively determine whether to perform filtering even on a pixel in a block encoded in other mode than I_PCM mode. In case the SAO 220 is determined not to apply, the filtering module 145 might not perform the SAO process. At this time, the encoder may send, to the decoder, information about whether the current block has been I_PCM encoded and/or information about whether the SAO applies.

Meanwhile, as described above, the filtering module 145 may apply the adaptive loop filter 230 as the in-loop filter. As an example, the ALF 230 may be positioned behind the SAO 220. Accordingly, the ALF 230 may perform filtering based on a value obtained by comparing the original image with the reconstructed image that is output after the deblocking filtering and/or SAO process have been carried out. In case neither deblocking filtering nor SAO process is performed, the ALF 230 may perform filtering the reconstructed image itself that is input to the filtering module 145. At this time, the encoder may generate information on whether to apply an ALF and filter coefficient information and send the information to the decoder. A specific embodiment of the ALF 230 process is described below, and detailed description thereof is skipped here.

Figure 3:
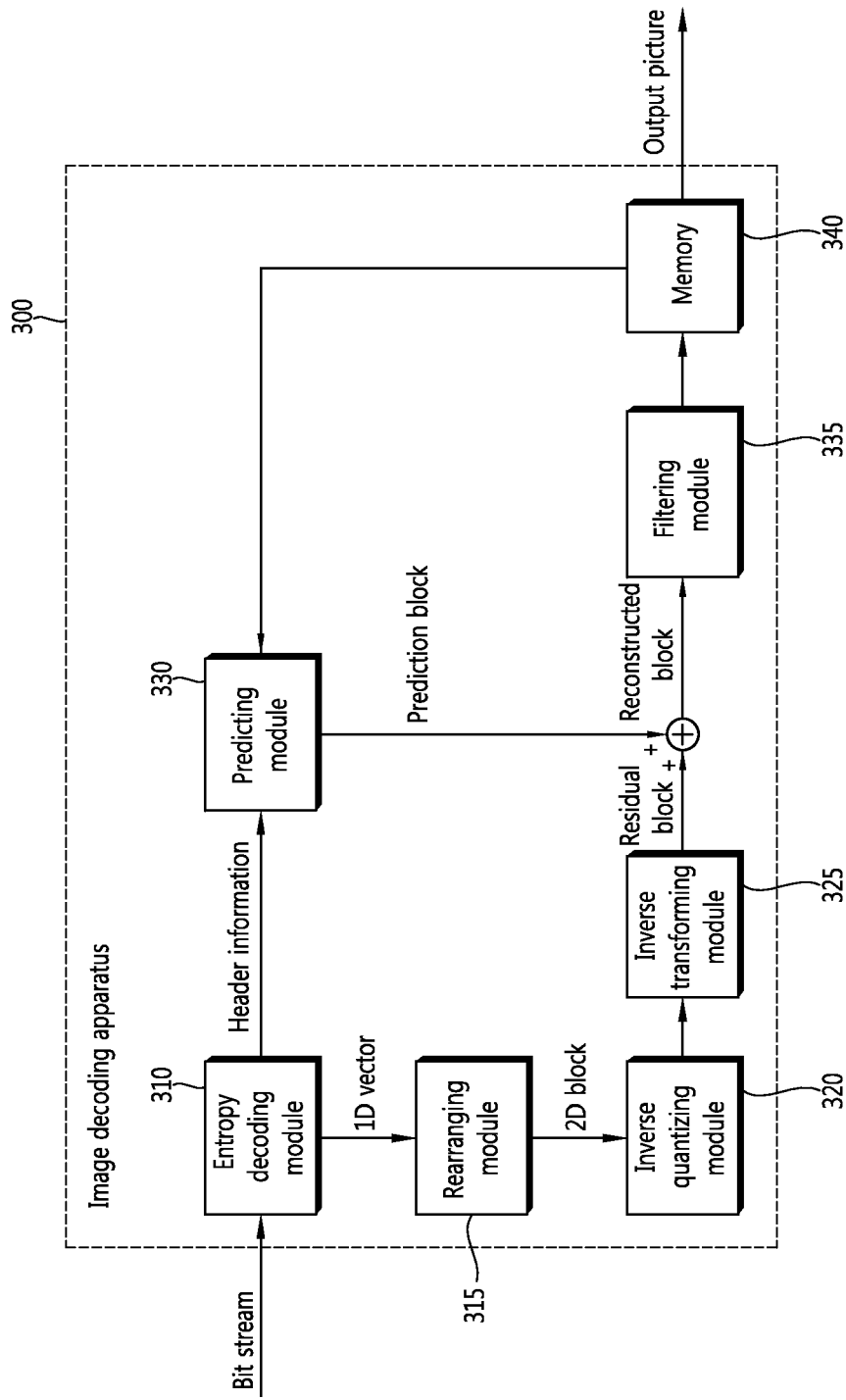
FIG. 3 is a black diagram schematically illustrating an image decoding apparatus according to an embodiment of the present invention.

FIG. 3 is a block diagram schematically illustrating an image decoding apparatus according to an embodiment of the present invention. Referring to FIG. 3, the image decoding apparatus 300 may include an entropy decoding module 310, a rearranging module 315, an inverse-quantizing module 320, an inverse-transforming module 325, a predicting module 330, a filtering module 335, and a memory 340.

In case an image bit stream is input to the image decoding apparatus 300, the input bit stream may be decoded according to a procedure in which the image information has been processed in the image encoding apparatus 100.

The entropy decoding module 310 may perform entropy decoding on the input bit stream, and the entropy decoding method is similar to the above-described entropy encoding method. In case entropy decoding applies, a lower value of index and its corresponding shorter codeword may be assigned to a symbol having a higher chance of occurrence, while a higher value of index and its corresponding longer codeword may be assigned to a symbol having a lower chance of occurrence. Accordingly, the bit count on the symbols targeted for encoding may be reduced and image compression performance may be enhanced by entropy encoding.

Among the information decoded in the entropy decoding module 310, the information for generating a prediction block is provided to the predicting module 330, and a residual value that has been subjected to entropy decoding in the entropy decoding module 310 may be input to the rearranging module 315.

The rearranging module 315 may rearrange the bit stream entropy-decoded in the entropy decoding module 310 based on the rearranging method of the image encoding apparatus 100. The rearranging module 315 may reconstruct the coefficients represented in the form of a 1-dimensional vector back to the coefficients having a 2-dimensional block form, thereby performing rearrangement. The rearranging module 315 may perform rearrangement by receiving information related to coefficient scanning that has been performed in the encoder and performing inverse scanning based on the order of scanning performed in the encoder.

The inverse-quantizing module 320 may perform inverse quantization based on the coefficient value of the rearranged block and quantization parameters provided from the encoder.

The inverse-transforming module 325 may perform inverse DCT and/or inverse DST on the result of the quantization performed in the image encoder, as opposite to the DCT and DST that have been performed by the transforming unit of the encoder. The inverse transform may be carried out based on the unit of transmission or unit of splitting an image, determined in the encoder. DCT and/or DST may be selectively performed depending on a plurality of information such as predicting methods, size of the current block or prediction direction in the transforming unit of the encoder, and the inverse-transforming module 325 of the decoder may perform inverse transform based on the information on the transform performed in the transforming unit of the encoder.

The predicting module 330 may generate a prediction block based on information on the previously decoded block and/or picture provided from the memory 340 and prediction block generation-related information provided from the entropy decoding module 310. The predicting module 330 may perform intra prediction in case the prediction mode for the corresponding prediction unit is the intra prediction mode. At this time, the predicting module 330 may generate a prediction block based on the information on a pixel in the current picture. Further, the predicting module 330, in case the prediction mode far the corresponding prediction unit is the inter prediction mode, may perform inter prediction. At this time, the predicting module 330 may perform inter prediction on the current prediction unit based on the information included in at least one picture among the previous or subsequent pictures of the current picture in which the current prediction unit is included using the information regarding the inter prediction of the current prediction unit provided from the image encoder, for example, information on the motion vector or reference picture index. The reconstructed block may be generated using the prediction block generated in the predicting module 330 and the residual block provided from the inverse-transforming module 325.

The reconstructed block and/or picture may be provided to the filtering module 335. The filtering module 335 may apply an in-loop filter to the reconstructed block and/or picture. The in-loop filter may include a deblocking filter, an SAO (sample adaptive offset) and/or an adaptive loop filter (ALF).

The memory 340 may store the reconstructed block or picture to be used as a reference picture or reference block and may provide the reconstructed picture to an output unit.

Figure 4:
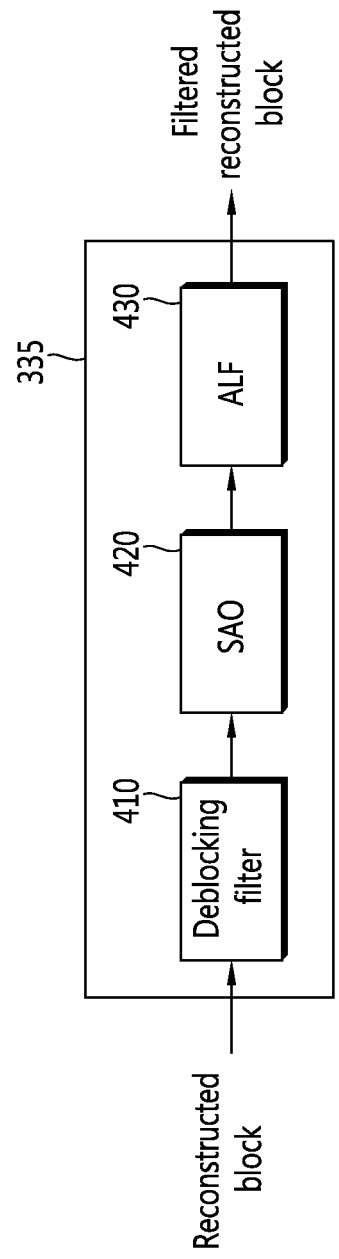
FIG. 4 is a block diagram schematically illustrating a filtering module of an image decoding apparatus according to an embodiment of the present invention.

FIG. 4 is a block diagram schematically illustrating a filtering module of an image decoding apparatus according to an embodiment of the present invention. Referring to FIG. 4, the filtering module 335 may include a deblocking filter 410, an SAO 420 and/or an adaptive loop filter (ALF) 430.

The deblocking filter 410, like the deblocking filter 210 of the encoder, may remove block distortions that are generated at the inter-block boundary in the reconstructed picture. A deblocking filtering process may apply to all the prediction unit edges and transform unit edges in the picture, and thus, the deblocking filter 410 may set a transform unit boundary and a prediction unit boundary that are to be applied with the deblocking filter in the current block.

The deblocking filter 410 may determine a bS for a block edge and/or inter-block boundary based on the transform unit boundary and prediction unit boundary. If the bS is determined, the deblocking filter 410 may determine whether to perform filtering. As an example, the deblocking filter 410 may determine that no filtering is performed on a pixel in a block encoded in I_PCM mode. As described in connection with FIG. 2, the encoder may send, to the decoder, information as to whether the current CU has been I_PCM encoded, and the deblocking filter 410 may determine whether the current CU has been encoded in I_PCM mode based on the received information.

Whether filtering is performed being determined, the deblocking filter 410 may or may not perform deblocking filtering according to the result of the determination. A deblocking filtering process when filtering is determined to be performed has been described above in connection with FIG. 2, and detailed description thereof is skipped here.

Meanwhile, the filtering module 335 may apply to the SAO 420 as an in-loop filter. As described above in connection with FIG. 2, the SAO 420 may be positioned after the deblocking filter 410. At this time, in case no deblocking filtering is performed on the reconstructed block input to the filtering module 335, the SAO 420 may perform an SAO process on the reconstructed block (and/or reconstructed slice and/or reconstructed picture) itself, input to the filtering module 335.

While applying the SAO 420, the filtering module 335 may adaptively determine whether to apply an SAO process. As described above in connection with FIG. 2, the encoder may send, to the decoder, e.g., information regarding whether to apply an SAO and/or information regarding whether the current block has been I_PCM encoded, and the SAO 420 may determine whether to perform an SAO process based on the transmitted information. An embodiment of a process of applying an SAO 420 process has been described in detail above in connection with FIG. 2, and detailed description thereof is skipped here, Adaptive Offset Process This process is another loop filtering process of reconstructing the offset difference between the picture undergoing the deblocking filter and the original picture for each pixel. The adaptive offset process is classified into a band offset and an edge offset, which will be obtained as follows.

Band Offset & Band Offset

Figure 12:
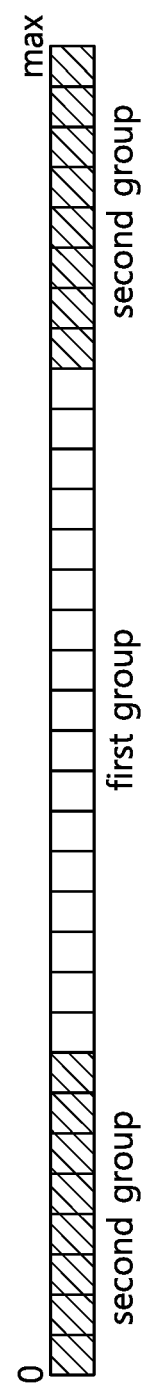
FIG. 12 is a diagram illustrating bandoff sets assigned to a first group and a second group according to an embodiment of the present invention.

The pixels of a deblocked picture are classified into 32 bands depending on the values of intensity. The 32 bands are roughly grouped into two groups as shown in FIG. 12. 16 band offsets are assigned to the first group and 16 offsets are assigned to the second group. The decoder similarly groups all the pixels as shown in FIG. 12 and adds the offset values transmitted for each band.

On the other hand, as shown in FIG. 20 (b), a histogram has various distributions depending on characteristics of a picture. In order to more efficiently transmit the offset, the entire area of the pixel range can be adaptively divided. For example, when a picture has a histogram more distributed to the central portion, the central portion can be more finely divided and the peripheral portion thereof can be more roughly divided. That is, when the pixel range is 256, the central portion can be divided into 16 bands each having 4 pixels and the peripheral portion can be divided into 12 bands each having 16 pixels to transmit the offset value. On the contrary, when a picture has a histogram more distributed to the peripheral portion, the central portion can be divided into 12 bands each having 16 pixels and the peripheral portion can be divided into 16 bands each having 4 pixels to transmit the offset value.

Figure 13:
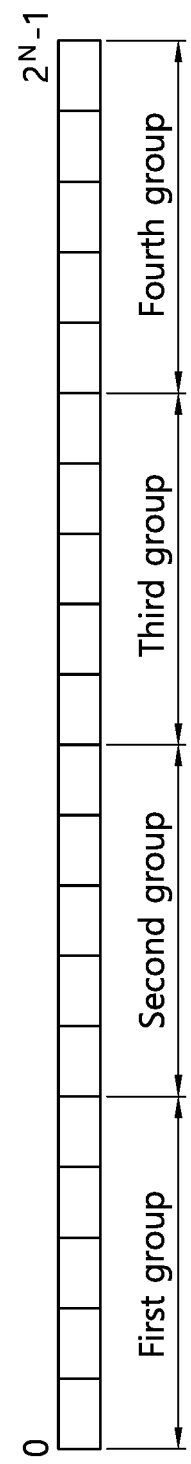
FIG. 13 are offset groups classified into four groups according to an embodiment of the present invention.
Figure 14A:
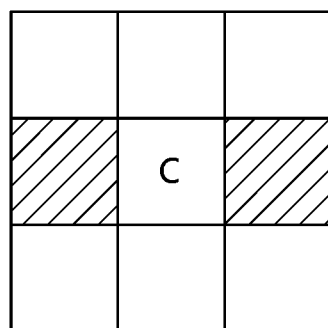
Figure 14B:
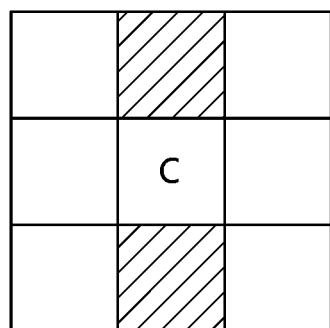
Figure 14C:
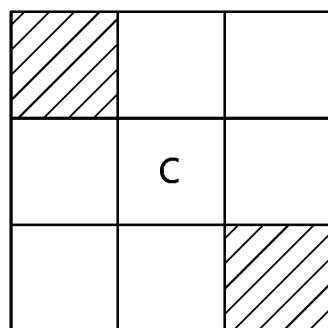
Figure 14D:
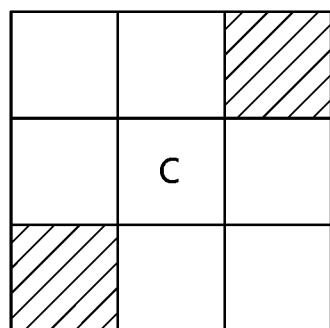

The band groups do not have to be necessarily divided into the central portion and the peripheral portion, but may be divided into N groups as follows. In this case, fine offset information on some pixel ranges can be provided. For example, as shown in FIG. 13, the local characteristics can be better reflected by dividing the entire pixel range into four groups and transmitting the offset information for each group.

On the other hand, in the two types of band offset transmission methods, the pixel range covered by each group is fixed. Accordingly, when the occurrence frequency of a specific band in the groups is very small, or when the value of the band offset is 0, the value is unconditionally transmitted. In order to prevent this problem, the encoder can transmit the range of the band offset to be used for the current picture to solve the above-mentioned problem. For example, when the offsets of the current picture mainly occur from pixel value range 32 to 160 and the band offsets with a uniform interval are used (for example, when the size of each band in pixel ranges 0 to 256 is 8, 32 bands are constructed in total), the values of band_start=4 and band_end=20 are transmitted to prevent transmission of unnecessary offsets. A method of counting each band and transmitting the offset values of only the bands having a high occurrence frequency can also be used. For example, only the offset values of 0, 4, 5, 6, 7, 9, 12, 15, 19, 20, 23, and 25 which are bands having a high occurrence frequency out of bands 0 to 31 can be transmitted but the offsets of the bands having a low occurrence frequency may not be transmitted. At this time, information on what band the transmitted offset is associated with should be additionally transmitted.

The second offset is an edge offset in which edge information of each pixel is considered. C represents the value of a current pixel, and is divided into five groups as shown in the below table. The offset values are transmitted for each group. The decoder similarly groups all the pixels as shown in FIGS. 14(a)-14(e) and then adds the transmitted offset values to the corresponding pixels of each group to reconstruct the pixels.

Figure 15:
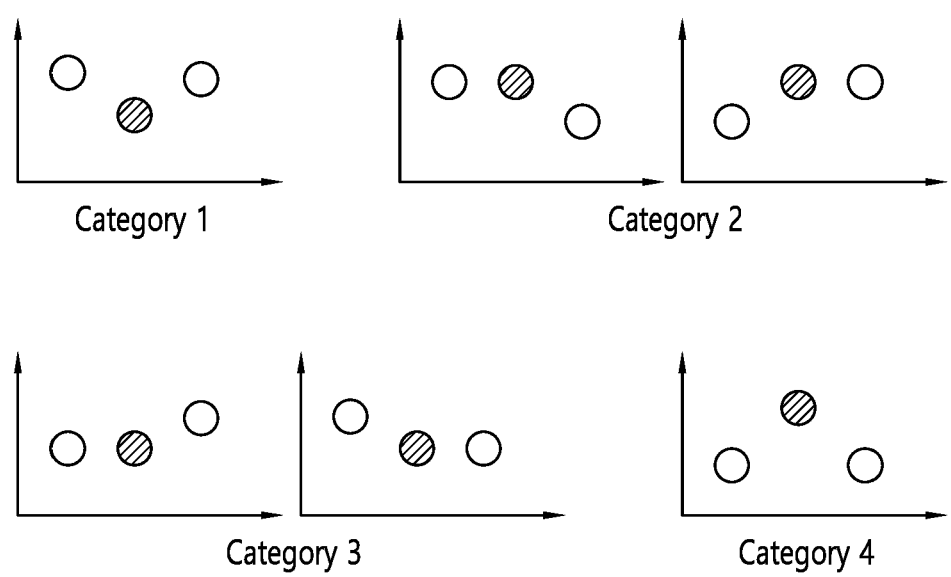
FIG. 15 illustrates distribution of pixels for each category according to an embodiment of the present invention.
Figure 16A:
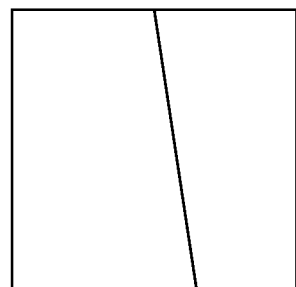
FIGS. 16(a)-16(d) are representative types of an edge which can appear for each direction according to an embodiment of the present invention.
Figure 16B:
Figure 16C:
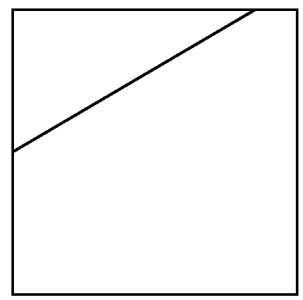
Figure 16D:
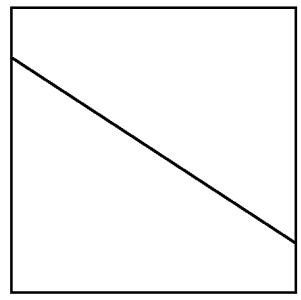

FIG. 15 show distributions of pixels for every category. Categories 1 and 4 indicate edges which can occur when the current pixel is larger or smaller than the peripheral pixels. Categories 2 and 3 indicate edges which can occur when the current pixel is a boundary of a certain area.

FIGS. 16(a)-16(d) show the shapes of a representative edge offset which can appear for each angle. Therefore, four types of edge offsets can be used for a single filtering unit (of which the smallest unit is an LCU) depending on the angles of the edges.

The filtering unit will be described in brief below. For an adaptive offset, a picture is divided in the form of quad tree, and offset application, offset type (basically two band offsets and four edge offsets), offset values are transmitted for each filtering unit. See FIG. 17.

Figure 17:
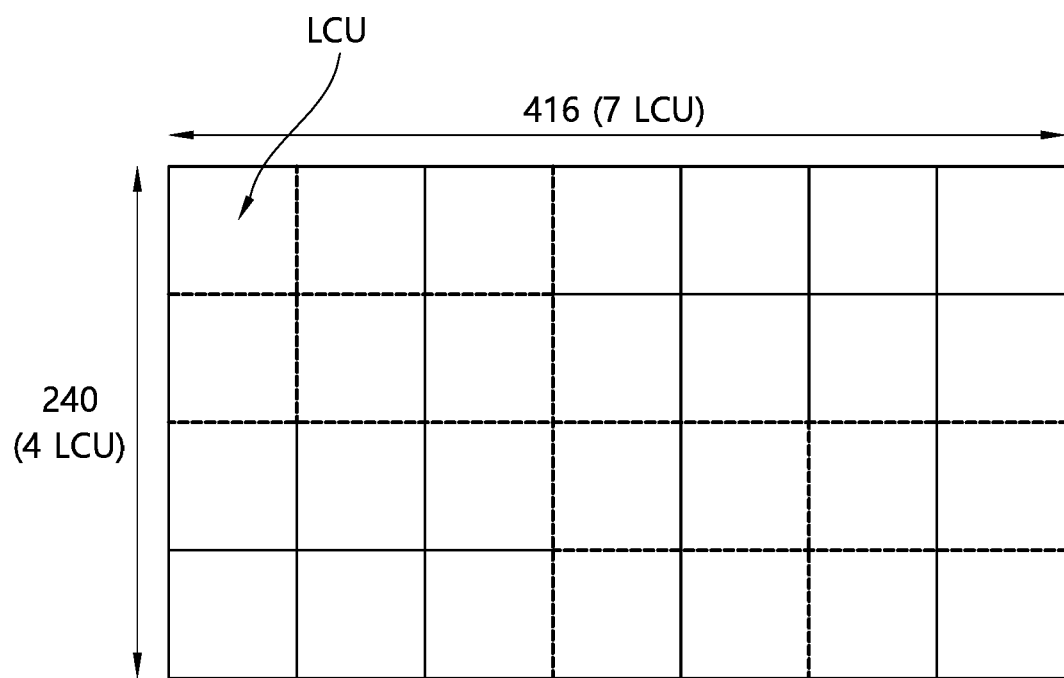
FIG. 17 illustrates filtering unit constructure of quadtree structure for applying adaptive offset.
Figure 18:
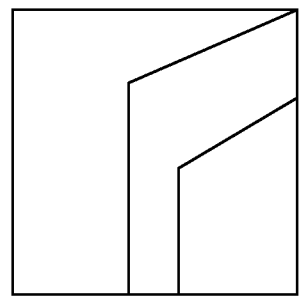
FIG. 18 illustrates different edges may be present in a single LOU (0 degree & 135 degree).
Figure 19A:
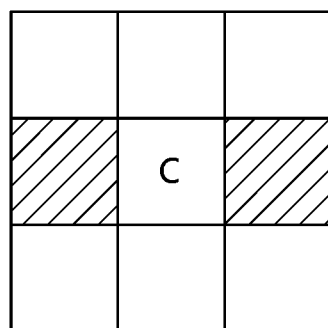
Figure 19B:
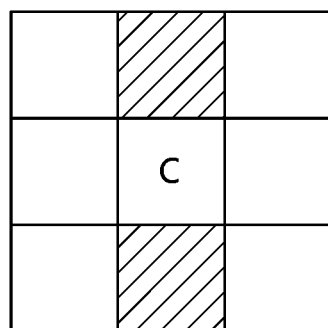
Figure 19C:
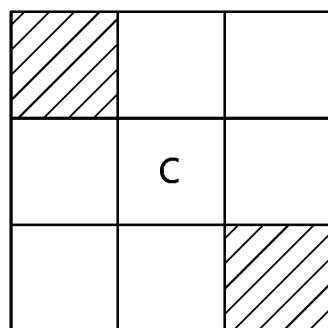
Figure 19D:
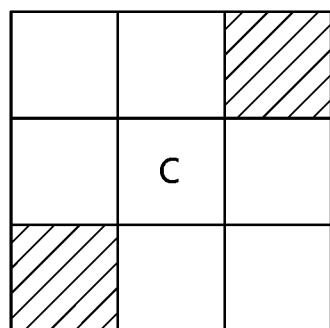
Figure 19E:
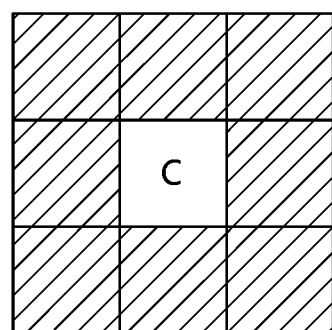
Figure 20A:
FIGS. 20(a)-20(d) illustrate comparison of histogram distributions for areas Y, Cb, and Cr.
Figure 20B:
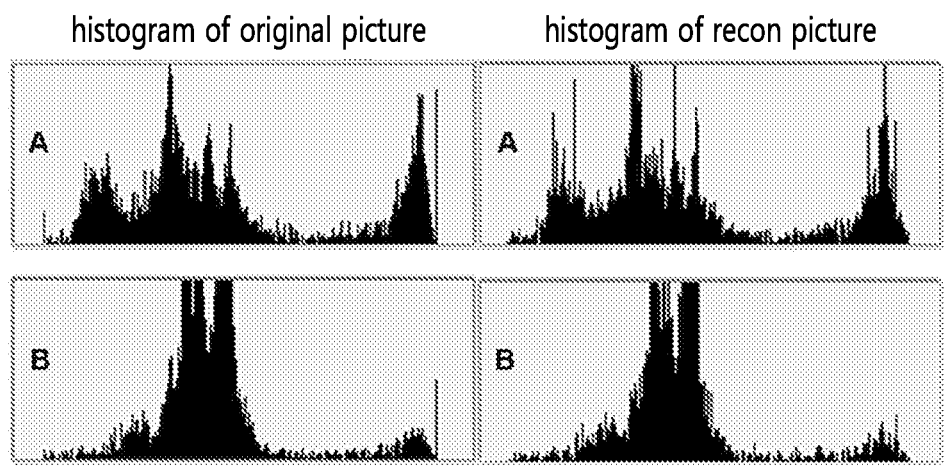
Figure 20C:
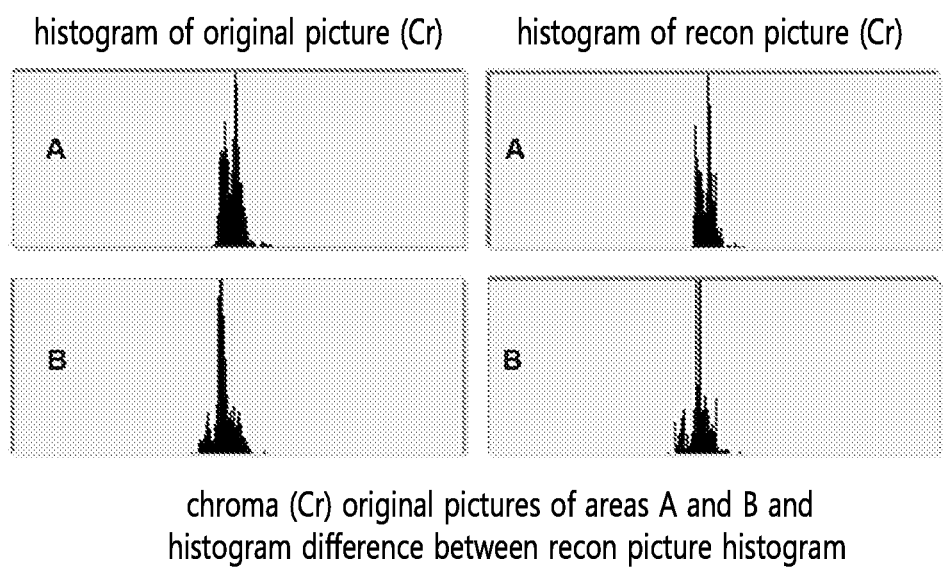
Figure 20D:
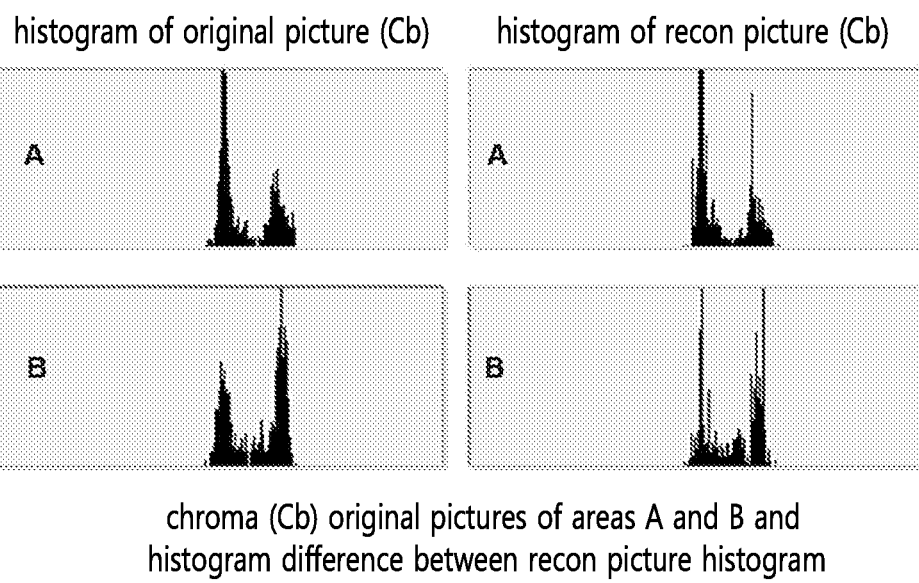

FIG. 17 shows an example where a WQVGA (416×240) picture is divided in the quad tree structure. Each unit has to be larger than the smallest LOU. However, 64×64 which is the size of the LOU becomes excessively larger as the picture size becomes smaller. This is because two or more offsets may be necessary for a single LOU as shown in FIG. 18.

Therefore, in order to enhance the adaptive offset efficiency, two or more edges offsets may be used for a single filtering unit.

Syntax information for implementing the above-mentioned various techniques is as follows,

|  | C | Descriptor |
|---|---|---|
| seq_parameter_set_rbsp( ) { | | |
| ... | | |
| sao_used_flag | 1 | u(1) |
| ... | | |
| } | | | sao_used_flag equal to 0 denotes that SAO is disabled for the current sequence; equal to 1 denotes that SAO is enabled for current sequence.

|  | C | Descriptor |
|---|---|---|
| slice_header( ) { | | |
| ... | | |
| sao_param( ) | 2 | |
| } | | |
| sao_param( ) { | | |
| sao_flag | 2 | u(1)\|ae(v) |
| if( sao_flag ) { | | |
| sao_split_param( 0, 0, 0 ) | | |
| sao_offset_param( 0, 0, 0 ) | | |
| } | | |
| } | | | sao_flag equal to 0 denotes that SAO is disabled for the entire picture; equal to 1 denotes that SAO is enabled for at least a portion of the current picture.

|  | C | Descriptor |
|---|---|---|
| sao_split_param( x, y, Depth ) { | | |
| if( Depth < MaxSplitLevel ) | | |
| split_flag[Depth][y][x] = sao_split_flag | 2 | u(1)\|ae(v) |
| else | | |
| split_flag[Depth][y][x] = 0 | | |
| if( split_flag[Depth][y][x] ) { | | |
| pqao_split_param( x + 0, y + 0, Depth + 1 ) | | |
| pqao_split_param( x + 1, y + 0, Depth + 1 ) | | |
| pqao_split_param( x + 0, y + 1, Depth + 1 ) | | |
| pqao_split_param( x + 1, y + 1, Depth + 1 ) | | |
| } | | |
| } | | | sao_split_flag equal to 0 denotes that current region is a leaf; equal to 1 denotes that the current region is further spitted into four children region.

|  | C | Descriptor |
|---|---|---|
| sao_offset_param ( x, y, Depth ) { | | |
| if( split_flag[Depth][y][x] ) { | | |
| sao_offset_param ( x + 0, y + 0, Depth + 1 ) | | |
| sao_offset_param ( x + 1, y + 0, Depth + 1 ) | | |
| sao_offset_param ( x + 0, y + 1, Depth + 1 ) | | |
| sao_offset_param ( x + 1, y + 1, Depth + 1 ) | | |

|  | C | Descriptor |
|---|---|---|
| ``}  else  {      type_idx[Depth][y][x] = sao_type_idx`` | 2 | ue(v)\|ae(v) |
| ``    if( sao_type_idx != 0 ) {        if( sao_type_idx > 5 ) { // offset type is bandoffset            start_offset            end_offset        } else {            start_offset = 0            end_offset = PqaoOffsetNum[sao_type_idx]        }        for( i = start_offset; i < end_offset; i++ )            offset[Depth][y][x][i] = sao_offset`` | 2 | se(v)\|ae(v) |
| ``    }  }}`` | | | sao_type_idx indicates the offset type to be applied for the current region as follows.

start_offset Indicates the smallest number of bandoffset or edgeoffset to be used. If it is not available, it is inferred to 0.

end_offset indicates the largest number of bandoffset or edgeoffset to be used. If it is not available, it is set to PqaoOffsetNum[sao_type_idx].

In order to use a method of transmitting only a valid band, the following syntax can be used.

|  | C | Descriptor |
|---|---|---|
| ``sao_offset_param ( x, y, Depth ) {  if( split_flag[Depth][y][x] ) {    sao_offset_param ( x + 0, y + 0, Depth + 1 )    sao_offset_param ( x + 1, y + 0, Depth + 1 )    sao_offset_param ( x + 0, y + 1, Depth + 1 )    sao_offset_param ( x + 1, y + 1, Depth + 1 )  } else {    type_idx[Depth][y][x] = sao_type_idx`` | 2 | ue(v)\|ae(v) |
| ``    if( sao_type_idx != 0 ) {      if( sao_type_idx > 5 ) { // offset type is bandoffset        total_offset_num_minus_one        for( i=0; i<total_offset_num_minus_one +1; i++) {          offset_idx[i]          offset[Depth][y][x][offset_idx[i]] = sao_offset        }      } else {        for( i = 0; i < PqaoOffsetNum[sao_type_idx]; i++ )          offset[Depth][y][x][i] = sao_offset`` | 2 | se(v)\|ae(v) |
| ``      }    }  }}`` | | | total_offset_num_minus_one indicates the total number of bandoffset offset_idx[i] indicates the index of bandoffset sao_offset indicates the offset value.

In order to use two or more edge offsets in a single filtering unit in the above-mentioned technique, the following syntax structure can be used.

|  | C | Descriptor |
|---|---|---|
| ``sao_offset_param ( x, y, Depth ) {  if( split_flag[Depth][y][x] ) {    sao_offset_param ( x + 0, y + 0, Depth + 1 )    sao_offset_param ( x + 1, y + 0, Depth + 1 )    sao_offset_param ( x + 0, y + 1, Depth + 1 )    sao_offset_param ( x + 1, y + 1, Depth + 1 )  } else {    type_idx[Depth][y][x] = sao_type_idx`` | 2 | ue(v)\|ae(v) |
| ``    if( sao_type_idx != 0 ) {      if( sao_type_idx <5 ) {        num_edge_offset        for( k = 0; k < num_edge_offset; k++ ) {`` | | |

|  | C | Descriptor |
|---|---|---|
| ``for( i = 0; i < PqaoOffsetNum[sao_type_idx]; i++ )``<br>`    offset[k][Depth][y][x][i] = sao_offset`<br>`} else {`<br>`  for( i = 0; i < PqaoOffsetNum[sao_type_idx]; i++ )`<br>`      offset[0][Depth][y][x][i] = sao_offset`<br>`  }`<br>`    }`<br>`  }`<br>`}` | 2 | se(v)\|ae(v) | num_edgo_offset indicates the total number of edge offset.

As another method of using one or more edge offsets in a single partition, new edge offsets (mixed edge offsets) can be defined as shown in FIGS. 19(a)-19(g).

The mixed offset can be defined in various ways. For example, the mixed offset may be defined as a mode in which 1-D 0-degree and 1-D 90-degree of four existing edge offsets are mixed. At this time, the number of offset categories to be transmitted is eight. Four categories are offset values for 0-degree (X-degree) and the other four offsets are offset values for 90-degree (Y-degree).

This method can extend to two or more edge offsets. That is, three or four edge offsets can be mixed.

In the decoding process, the offset filtering is first performed on a deblocked picture using X-degree EO and Y-degree EO is then performed on the resultant value.

The mixed EO may be used for both the luma and chroma channels or may be used for only the chroma channel.

The concept may extend to the mixture of the edge offset and the band offset in addition to the edge offset. For example, a new mixed offset type is first defined and then band offset 0 and edge offset 1 are simultaneously used.

Then, 16 band offset values and 4 edge offset values are transmitted as the offset values. In the decoding step, the band offset is first applied and then the edge offset is applied.

Adaptive Offset for Chroma Signal

FIGS. 11(a)-11(d) show that the local distribution of a histogram varies in a single picture. In addition, it can be seen that the local characteristics have a very great difference between a luma signal and a chroma signal.

Figure 21A:
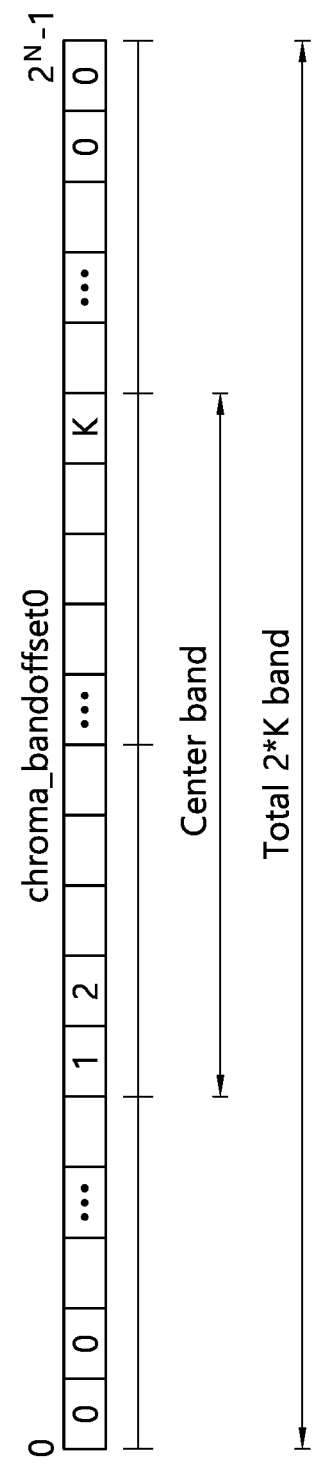
FIGS. 21(a)-21(b) illustrate chroma_bandoffset0 and chroma_bandoffset1 according to an embodiment of the present invention.
Figure 21B:
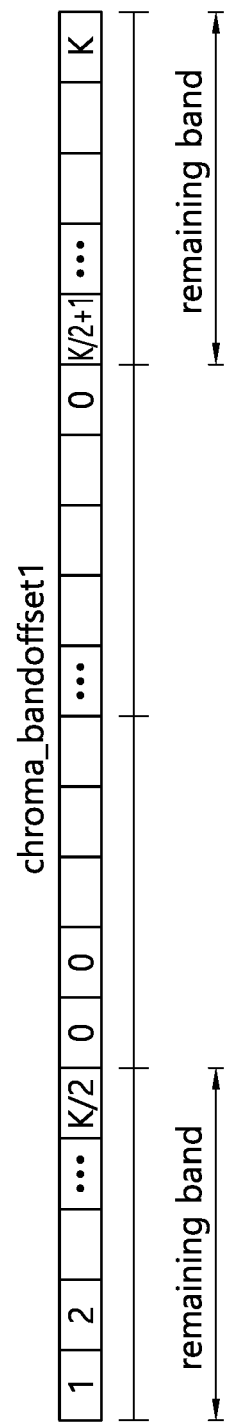

Therefore, the offset of a chroma signal in addition to the offset of a luma signal should be independently transmitted. When the range of the chroma signal is 0 to $2^N-1$ (where N is a bit depth), the magnitude of the total bit depth can be divided as shown in FIGS. 21(a)-21(b).

For example, when K=16 is set, the entire range is divided into 32 bands and is classified into two types of bands of 16 bands for the central portion and 16 bands for the peripheral portion for transmission. When the total number of bands is set to K=8 in consideration of the fact that the variance of the chroma signal is smaller than that of the luma signal, the total number of bands is 16 and includes 8 bands for the central portion and 8 bands for the peripheral portion.

The chroma offset information includes the following syntax information.

|  | C | Descriptor |
|---|---|---|
| `sao_offset_param ( x, y, Depth ) {`<br>`  if( split_flag[Depth][y][x] ) {`<br>`    sao_offset_param ( x + 0, y + 0, Depth + 1 )`<br>`    sao_offset_param ( x + 1, y + 0, Depth + 1 )`<br>`    sao_offset_param ( x + 0, y + 1, Depth + 1 )`<br>`    sao_offset_param ( x + 1, y + 1, Depth + 1 )`<br>`  } else {`<br>`    type_idx[Depth][y][x] = sao_type_idx` | 2 | ue(v)\|ae(v) |
| `    if( sao_type_idx != 0 ) {`<br>`      for( i = 0; i < PqaoOffsetNum[sao_type_idx]; i++ )`<br>`        offset[Depth][y][x][i] = sao_offset` | 2 | se(v)\|ae(v) |
| `      type_idx[Depth][y][x] = sao_type_cr_idx`<br>`      if( sao_type_cr_idx != 0 ) {`<br>`        for( i = 0; i < PqaoOffsetNum[sao_type_cr_idx]; i++ )`<br>`          offset[Depth][y][x][i] = sao_cr_offset`<br>`      }`<br>`      type_idx[Depth][y][x] = sao_type_cb_idx`<br>`      if( sao_type_cb_idx != 0 ) {`<br>`        for( i = 0; i < PqaoOffsetNum[sao_type_cb_idx]; i++ )`<br>`          offset[Depth][y][x][i] = sao_cb_offset`<br>`      }`<br>`    }`<br>`  }`<br>`}` |  |  | sao_type_cr_idx indicates the offset type for Cr signal.
sao_type_cb_idx indicates the offset type for Cb signal.
sao_cr_offset indicates the offset value for Cr signal.
sao_cb_offset indicates the offset value for Cb signal.

On the other hand, a method of reducing the amount of side information while maintaining the performance of the chroma offset can also be used. The edge components of the chroma signal are smaller and simpler than those of the luma signal. Accordingly, by reducing the number of edge categories to two instead of setting the number of edge categories to four like luma, the amount of side information can be reduced. That is, in the edge offset table shown in FIG. 10, categories 1 and 3 can be reduced to a single offset and categories 2 and 4 can be reduced to a single offset. Then, the number of offset values to be transmitted when the edge offset is selected can be reduced from four to two.

FIG. 12. Reduced EO category

| Category | Condition |
| --- | --- |
| 1 | c < 2 neighboring pixels or c < 1 neighbor && c == 1 neighbor |
| 2 | c > 1 neighbor && c == 1 neighbor or c > 2 neighbors |
| 0 | None of the above |

This method is on the assumption that the same filtering partition is used for the luma signal and the chroma signal. When independent partitions are allowed for the luma signal and the chroma signal in order to obtain the optimal performance, the syntax structure may be as follows.

| | C | Descriptor |
| --- | --- | --- |
| sao_param( ) { | | |
|   sao_flag | 2 | u(1)\|ae(v) |
|   if( sao_flag ) { | | |
|     sao_split_param( 0, 0, 0 ) | | |
|     sao_offset_param( 0, 0, 0, 0 ) | | |
|     sao_flag_cb | | |
|     if( sao_flag_cb ) { | | |
|       sao_split_param( 0, 0, 1 ) | | |
|       sao_offset_param( 0, 0, 0, 1 ) | | |
|     } | | |
|     sao_flag_cr | | |
|     if( sao_flag_cr ) { | | |
|       sao_split_param( 0, 0, 2 ) | | |
|       sao_offset_param( 0, 0, 0, 2 ) | | |
|     } | | |
|   } | | |
| } | | | sao_flag equal to 1 indicates that SAO for luma signal is used, otherwise it is not used.
sao_flag_cb equal to 1 indicates that SAO for Cb signal is used, otherwise it is not used.
sao_flag_cr equal to 1 indicates that SAO for Cr signal is used, otherwise it is not used.

| | C | Descriptor |
| --- | --- | --- |
| sao_split_param( x, y, Depth, component) { | | |
|   if( Depth < MaxSplitLevel ) | | |
|     split_flag[Depth][y][x] = sao_split_flag | 2 | u(1)\|ae(v) |
|   Else | | |
|     split_flag[Depth][y][x] = 0 | | |
|   if( split_flag[Depth][y][x] ) { | | |
|     sao_split_param( x + 0, y + 0, Depth + 1, component) | | |
|     sao_split_param( x + 1, y + 0, Depth + 1, component) | | |
|     sao_split_param( x + 0, y + 1, Depth + 1, component) | | |
|     sao_split_param( x + 1, y + 1, Depth + 1, component) | | |
|   } | | |
| } | | | sao_split_flag equal to 0 indicates that current region is a leaf, otherwise it indicates that the current region is further spitted into four children regions.

| | C | Descriptor |
| --- | --- | --- |
| sao_offset_param ( x, y, Depth, component ) { | | |
|   if( split_flag[component][Depth][y][x] ) { | | |
|     sao_offset_param ( x + 0, y + 0, Depth + 1, component ) | | |
|     sao_offset_param ( x + 1, y + 0, Depth + 1, component ) | | |
|     sao_offset_param ( x + 0, y + 1, Depth + 1, component ) | | |
|     sao_offset_param ( x + 1, y + 1, Depth + 1, component ) | | |
|   } else { | | |
|     type_idx[component] [Depth][y][x] = sao_type_idx | 2 | ue(v)\|ae(v) |
|     if( pqao_type_idx != 0 ) { | | |
|       for( i = 0; i < SaoOffsetNum[sao_type_idx]; i++ ) | | |
|         offset[component] [Depth[y][x][i] = sao_offset | 2 | se(v)\|ae(v) |
|     } | | |
|   } | | |
| } | | | sao_type_idx indicates the offset type to be applied for the current region.

sao_offset indicates the offset of a pixel group.

When the luma filtering partitioning is used for Cr and Cb without any change, the filtering partition is not optimized for the chroma component and thus a slight degradation in performance may occur. Therefore, a method of allowing partitions which can be commonly used for Cr and Cb signals in consideration of performance of chroma offset coding may be used. In this case, the syntax structure can be deformed as follows.

| | C | Descriptor |
|---|---|---|
| sao_param( ) { | | |
|   sao_flag | 2 | u(1)\|ae(v) |
|   if( sao_flag ) { | | |
|     sao_split_param( 0, 0, 0 ) | | |
|     sao_offset_param( 0, 0, 0, 0 ) | | |
|     sao_flag_cb | | |
|     sao_flag_cr | | |
|     if( sao_flag_cb \|\| sao_flag_cr ) | | |
|       sao_spliti_param (0, 0, 1) | | |
|     if( sao_flag_cb ) { | | |
|       sao_offset_param( 0, 0, 0, 1 ) | | |
|     } | | |
|     if( sao_flag_cr ) { | | |
|       sao_offset_param( 0, 0, 0, 2 ) | | |

-continued

| | C | Descriptor |
|---|---|---|
|   } | | |
| } | | |
| } | | |

The SAO partition of Luma and the SAO partition of Chroma may vary depending on characteristics of a correlation picture or a coding structure (Hierarchical B coding structure or low-delay coding structure). That is, the sharing of partition information may be good or bad for the coding efficiency. Therefore, in order to obtain the best coding efficiency, the partition sharing techniques can be adaptively determined in the unit of slices, pictures, or sequences. The following syntax structure is required for implementation thereof.

| | C | Descriptor |
|---|---|---|
| seq_parameter_set_rbsp( ) { | | |
|   ... | | |
|   sao_used_flag | 1 | u(1) |
|   if(sao_used_flag) | | |
|     sao_partition_sharing_flag | 1 | u(1) |
| } | | | sao_partition_sharing_flag equal to 0 denotes SAO partition sharing for chroma signal is disabled for the current sequence; equal to 1 denotes the opposite.

| | C | Descriptor |
|---|---|---|
| sao_param( ) { | | |
|   if(sao_used_flag) { | | |
|     sao_flag | 2 | u(1)\|ae(v) |
|     if(sao_flag && sao_partition_sharing_flag) | | |
|       sao_part_share_flag | | |
|   } | | |
|   if( sao_flag ) { | | |
|     sao_split_param( 0, 0, 0, 0 ) | | |
|     sao_offset_param( 0, 0, 0, 0 ) | | |
|     if(!sao_part_share_flag) { | | |
|       sao_flag_cb | 2 | u(1)\|ae(v) |
|       if( sao_flag_cb ) { | | |
|         sao_split_param( 0, 0, 0, 1 ) | | |
|         sao_offset_param( 0, 0, 0, 1 ) | | |
|       } | | |
|       sao_flag_cr | 2 | u(1)\|ae(v) |
|       if( sao_flag_cr ) { | | |
|         sao_split_param( 0, 0, 0, 2 ) | | |
|         sao_offset_param( 0, 0, 0, 2 ) | | |
|       } | | |
|     } | | |
|   } | | |
| } | | | sao_part_share_flag equal to 0 denotes SAO partition sharing for chroma signal is disabled for the current sequence; equal to 1 denotes the opposite.

| | C | Descriptor |
|---|---|---|
| sao_offset_param ( x, y, Depth ) { | | |
|   if( split_flag[Depth][y][x] ) { | | |
|     sao_offset_param ( x + 0, y + 0, Depth + 1 ) | | |
|     sao_offset_param ( x + 1, y + 0, Depth + 1 ) | | |
|     sao_offset_param ( x + 0, y + 1, Depth + 1 ) | | |
|     sao_offset_param ( x + 1, y + 1, Depth + 1 ) | | |
|   } else { | | |

|  | C | Descriptor |
|---|---|---|
| ```
    type_idx[Depth][y][x] = sao_type_idx
    if( sao_type_idx != 0 ) {
        for( i = 0; i < PqaoOffsetNum[sao_type_idx]; i++ )
            offset[Depth][y][x][i] = sao_offset
        if(sao_part_share_flag) {
            type_idx[Depth][y][x] = sao_type_cr_idx
            if( sao_type_cr_idx != 0 ) {
                for( i = 0; i < PqaoOffsetNum[sao_type_cr_idx; i++ )
                    offset[Depth][y][x][i] = sao_cr_offset
            }
            type_idx[Depth][y][x] = sao_type_cb_idx
            if( sao_type_cb_idx != 0 ) {
                for( i = 0; i < PqaoOffsetNum[sao_type_cb_idx]; i++ )
                    offset[Depth][y][x][i] = sao_cb_offset
            }
        }
    }
  }
}
``` | 2<br>2 | ue(v)\|ae(v)<br>se(v)\|ae(v) |

Further, the filtering module 335 may apply the ALF 430 as an in-loop filter. Like in the embodiment illustrated in FIG. 2, the ALF 430 may come next to the SAO 420 and may perform filtering based on a value obtained by comparing the original image with the reconstructed image obtained after deblocking filtering and/or SAO process have been performed. If neither deblocking filtering nor SAO process is performed, the ALF 430 may perform filtering on the reconstructed image itself, which is input to the filtering module 145. At this time, the decoder may perform adaptive loop filtering based on, e.g., filter coefficient information and information regarding whether to apply ALF, which are delivered from the encoder. A specific embodiment of a process of applying the ALF 430 is described below.

Hereinafter, in case an "image" or "screen Image" may be represented to have the same concept as a "picture" in light of the configuration or expression of the present invention, the "picture" may be described as the "Image" or "screen image." Further, the "inter prediction" and the "inter-frame prediction" are the same in meaning, and the "Intra prediction" and the "intra-frame prediction" are the same in meaning.

Meanwhile, an image signal may generally include three color signals that represent the size of three primary color components of light. The three color signals, respectively, may be represented R (red), G (green), and B (blue). To reduce a frequency band used for image processing, the R, G, and B signals may be transformed into a luma and chroma signal that are equivalent to the R, G, and B signals. At this time, an image signal may include one luma signal and two chroma signals. Here, the luma signal is a component that represents brightness of the screen, and the chroma signal Is a component that represents the color of the screen. The luma signal may be represented as L, and the two chroma signals may be represented as Cb and Cr, respectively. Since a human's eyes are sensitive to the luma signal but dull to the chroma signals, the number of pixels of a chroma component in one image or block may be smaller than the number of pixels of a luma component. In a 4:2:0 image format, the number of pixels in a chroma component block corresponding to a luma component block may be half the number of pixels of the luma component block in the horizontal direction and half the number of pixels of the luma component block in the vertical direction.

As described above in connection with FIGS. 1 and 3, the predicting unit may generate a prediction block for a current block by performing prediction based on information on a pixel in a current picture upon performing intra prediction. For example, the predicting unit may predict the value of a pixel in the current block using pixels in reconstructed blocks that are positioned at upper, left, upper left, and/or upper right ends of the current block. At this time, the unit of processing in which prediction is performed may differ from the unit of processing in which a prediction method and details are determined. For example, a prediction method and a prediction mode are determined on a per-PU basis, and prediction may be performed on a per-TU basis.

Intra prediction may be performed on each PU in the current block (for example, CU) in an intra prediction mode. The intra prediction mode may include a vertical, horizontal, DC, planar, or angular mode depending on predicting methods and/or position of reference pixels used for predicting pixel values in the current block. In the vertical mode, prediction may be performed in the vertical direction using pixel values of neighbor blocks, and in the horizontal mode, prediction may be performed in the horizontal direction using pixel values of neighbor blocks. Further, in the DC mode, a prediction block may be generated by an average of the pixel values of the reference pixels. In the angular mode, prediction may be performed according to a predetermined angle and/or direction with respect to each mode. Further, a predetermined prediction direction and prediction mode value may be used for intra prediction.

In case the prediction mode of the current block is the intra mode, the encode and decoder may use an I_PCM (Intra Pulse Code Modulation) mode in addition to the above intra prediction modes in order for lossless encoding. In case the I_PCM mode applies to the current block, the encoder may send the pixel values in the current block, as they are, to the decoder without performing prediction, transform, and/or quantization. At this time, the pixel values in the current block may be, by way of example, encoded in the order of raster scanning and may be sent to the decoder. The decoder might not perform prediction, inverse scaling, inverse transform, and/or inverse quantization on the block to which the I_PCM mode applies. At this time, the decoder may parse the pixel values transferred from the encoder and may then obtain the pixel values in the reconstructed block directly from the parsed pixel values.

In case the I_PCM mode is used, the encoder may send, to the decoder, information regarding whether the I_PCM mode applies to the current block (for example, CU). The information, for example, may be represented by a PCM flag. Here, the PCM flag may be a flag indicating whether the I_PCM mode applied to the current CU, that is, whether the current CU is encoded by the I_PCM. In an embodiment, the flag may be denoted pcm_flag. The encoder may entropy-encode the flag and may send it to the decoder. At this time, the decoder may receive and decode the encoded PCM flag and may determine whether the I_PCM applies to the current CU using the decoded PCM flag.

As described above, in case the pixel values in the current CU are encoded by the I_PCM, the decoder might not perform, e.g., prediction, inverse scaling, inverse transform, and/or Inverse quantization on the current CU. At this time, the decoder may parse the pixel value sent from the encoder and may then derive the reconstructed pixel value directly from the parsed pixel value. Here, the reconstructed pixel value may mean the pixel value reconstructed prior to application of the in-loop filter.

In case the current CU is encoded in the I_PCM mode, an embodiment of a method of producing a reconstructed pixel value of a luma component may be represented as follows:

$$\text{recSamples}_L[xC+i, yC+j] = \text{pcm\_sample\_luma}[(nS*j)+i] << (\text{BitDepth}_Y\text{PCMBitDepth}_Y), \text{ with } i,j=0 \ldots nS-1$$

Here, nS may refer to the size of the current CU. nS may be initialized as (1<<log 2CbSize), and log 2CbSize may denote a log value of the current CU size. recSamples$_L$ may mean a reconstructed pixel value of a luma component before applying the in-loop filter (for example, the deblocking filter), that is, a luma reconstructed pixel value. (xC, yC) may indicate the coordinate of the leftmost and upper pixel in the current CU. pcm_sample_luma may indicate a pixel value of a luma component, encoded on the current CU in the I_PCM mode and sent to the decoder. At this time, the luma component pixel value may have been encoded in the raster scanning order, for example. Further, PCMBitDepth$_Y$ may mean the number of bits used to represent each pixel corresponding to pcm_sample_luma, and BitDepth$_Y$ may mean the bit depth of luma component pixels in the current CU.

In case the current CU is encoded in the I_PCM mode, a reconstructed pixel value of a chroma component may be derived in a similar manner to that used in the above-described luma component embodiment.

By the above-described methods of deriving a reconstructed pixel value, the decoder may parse the pixel value sent from the encoder and may then copy the parsed pixel value (for example, pcm_sample_luma) as it is, using it as a reconstructed pixel value. In case the I_PCM mode applies to the current CU, the encoder may encode the pixel values in the current CU as they are without performing prediction, transform, and/or quantization and may send them to the decoder. Accordingly, the I_PCM mode may correspond to a lossless encoding mode, and the decoder may parse the received pixel values, then deriving the reconstructed pixel values directly from the parsed pixel values.

Meanwhile, to compensate for a difference between the original image and the reconstructed image that comes from errors arising during the course of a compression encoding process including quantization, an in-loop filter may apply to the reconstructed image. As described above, in-loop filtering may be performed by the filtering unit of the encoder and decoder, and the filtering unit may apply a deblocking filter, SAO (sample adaptive offset) and/or adaptive loop filter (ALF) to the reconstructed image. Here, the ALF may perform filtering based on a value obtained by comparing the original image with the image reconstructed after deblocking filtering and/or SAO process have been carried out.

Figure 5:
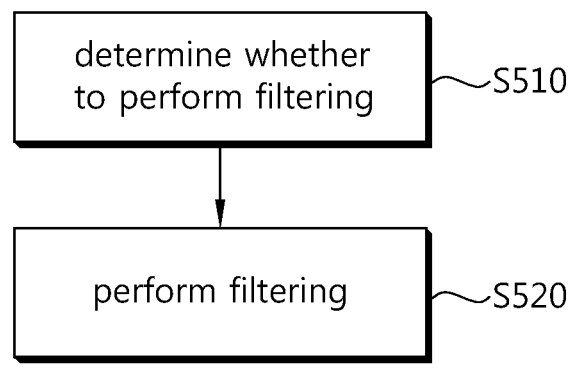
FIG. 5 is a flowchart schematically illustrating an embodiment an adaptive loop filtering performing method according to the present invention.

FIG. 5 is a flowchart schematically illustrating an embodiment of an adaptive loop filtering performing method according to the present invention.

As described above, the adaptive loop filter (ALF) may adaptively apply a Wiener filter to the image reconstructed after deblocking filtering and/or SAO process have been performed. That is, the ALF may make up for encoding errors using the Wiener filter. The ALF may apply after the SAO has been performed, and may be also rendered to apply only in the HE (High Efficiency) case.

Referring to FIG. 5, the encoder and decoder may determine whether to perform adaptive loop filtering (S510).

The encoder and decoder may determine whether to perform adaptive loop filtering on a per-slice basis or may determine whether to perform adaptive loop filtering at each CTB level and/or each CU level. In case whether to perform adaptive loop filtering on each CTB and/or each CU is determined, the filtering process may be performed more adaptively. Hereinafter, a CTB level-based and CU level-based process of determining whether to perform adaptive loop filtering is described in accordance with embodiments.

Information on whether to perform filtering, that is, ALF on-off-related information, may be included in a bit stream and may be sent from the encoder to the decoder. In an embodiment, the ALF on-off-related information may be included in a slice header and may be sent from the encoder to the decoder. Here, the ALF on-off-related information may include per-slice on-off information, per-CTB on-off Information and/or per-CU on-off information.

The information regarding whether to perform filtering, that is, the ALF on-off-related information, may include ALF flag information. As an example, the ALF flag information may correspond to a flag indicating whether adaptive loop filtering is performed on the current CU. In this case, the ALF flag information may correspond to the per-CU on-off information for the ALF, and as an example, may be denoted alf_cu_flag. At this time, the decoder may determine whether to apply the ALF on a per-CU basis, based on the received ALF flag information. Further, the ALF flag information may correspond to a flag indicating whether adaptive loop filtering is performed on the current CTB (coding tree block). In this case, the ALF flag information may correspond to the per-CTB on-off Information on the ALF, and as an example, may be denoted ctb_alf_flag. At this time, the decoder may determine whether to apply the ALF on a per-CTB basis, based on the received ALF flag information. As described above, the ALF flag information may correspond to the per-CU on-off information and/or per-CTB on-off information, but in embodiments to be described below, the ALF flag information is assumed to indicate the per-CU on-off information for ease of description. However, the present invention is not limited thereto, and embodiments described below may also apply in the same or similar way to where the ALF flag information includes per-CTB on-off information.

The information on whether to perform filtering, that is, the ALF on-off-related information, may include per-CU control flag information. In other words, the encoder may include the per-CU control flag information in a bit stream and may send it to the decoder. Here, the per-CU control flag information may be a flag indicating if it can be determined whether filtering can be performed on a per-CU basis, that is, whether the ALF is adaptively applied to each CU. As an example, the per-CU control flag information may be denoted alf_cu_control_flag.

For example, in case alf_cu_control_flag is 1, the encoder and decoder may determine whether to apply the ALF to the current CU depending on the ALF flag (e.g., alf_cu_flag) value. In other words, in case alf_cu_control_flag is 1, the encode and decoder may turn on or off the ALF process on a per-CU basis depending on the ALF flag value. In case alf_cu_control_flag is 0, the CU corresponding to alf_cu_control_flag might not have ALF flag information. That is, in such case, there may be no per-CU on-off information on the ALF.

The above-described process of determining whether to perform filtering on a per-CU (and/or per-CTB) basis may apply to a luma component block and a chroma component block in the same way. However, the process of determining whether to perform filtering on a per-CU basis (and/or per-CTB basis) may apply independently to each of the luma component block and chroma component block or may apply to only one of the luma component block and chroma component block.

In an embodiment, the encoder and decoder may determine whether to perform adaptive loop filtering on a per-CU (and/or per-CTB) basis only on the luma component block and might not apply the process of determining whether to perform filtering on a per-CU (and/or per-CTB) basis to the chroma component block. In this case, in applying the adaptive loop filter, an adaptive on-off process may be performed on the luma component block on a per-CU (and/or per-CTB) basis, but the per-CU (and/or per-CTB) basis adaptive on-off process might not be performed on the chroma component block. At this time, no adaptive loop filtering may be carried out on the chroma component block, and whether to perform adaptive loop filtering may be determined on a per-slice basis.

In another embodiment, the encoder and decoder may determine whether to perform adaptive loop filtering, on a per-CU (and/or per-CTB) basis, on each of the luma component block and the chroma component block.

In this case, the encoder may separately derive each of the ALF on-off-related information of the luma component block and the ALF on-off-related information of the chroma component block and may send them to the decoder. At this time, the decoder may determine whether to perform adaptive loop filtering on the luma component block based on the ALF on-off-related information corresponding to the luma component block and may determine whether to perform adaptive loop filtering on the chroma component block based on the ALF on-off-related information corresponding to the chroma component block. In such case, the decoder may separately determine whether to perform adaptive loop filtering on each of the luma component block and the chroma component block.

As another example, the ALF on-off-related information corresponding to the chroma component block may be derived in the same way by a predetermined process in the encoder and the decoder. In this case, the encoder and decoder may determine whether to perform adaptive loop filtering on the chroma component block based on the derived information.

As still another example, the encoder and decoder may apply the ALF on-off-related information of the luma component block to the chroma component block in the same way. In other words, the encoder and decoder may use the ALF on-off-related information of the luma component block as the ALF on-off-related information of the chroma component block. In such case, the encoder may send only the ALF on-off-related information of the luma component block to the decoder. At this time, the decoder may determine whether to perform adaptive loop filtering on the luma component block on a per-CU (and/or per-CTB) basis based on the received ALF on-off-related information. Further, the received information may also be used as the ALF on-off-related information of the chroma component block, and thus, the decoder may determine whether to perform adaptive loop filtering on the chroma component block on a per-CU (and/or per-CTB) basis based on the received ALF on-off-related information.

Meanwhile, the encoder and decoder might not perform an ALF process on a pixel in a block encoded in the I_PCM mode. That is, in case the current CU is encoded in the I_PCM mode, the encoder and decoder may skip the ALF process on a pixel in the current CU. As described above, in case the I_PCM mode applies, the encoder may send, to the decoder, the pixel values in the current CU, without performing prediction, transform, and/or quantization. At this time, the decoder may obtain the same reconstructed pixel value as the original data from the pixel value transferred from the encoder. Accordingly, there might be the need of omitting the ALF process in order to reconstruct the best quality of image.

In an embodiment, in case the current CU is encoded in the I_PCM mode, the encoder and decoder may determine that no ALF process is performed on a pixel in the current CU. At this time, whether the current CU has been encoded in the I_PCM mode may be determined based on a PCM flag and a PCM loop filter flag, for example. Here, the PCM loop filter flag may be a flag indicating whether an in-loop filter has been applied to the block encoded in the I_PCM mode and may be denoted pcm_loop_filter_disable_flag, for example. The PCM flag has been described earlier, and the detailed description thereof is skipped here.

Further, in case the current CU has been encoded in the I_PCM mode, the encoder and decoder may also determine whether to apply an ALF by different methods depending on the per-CU control flag (for example, alf_cu_control_flag, hereinafter referred to as alf_cu_control_flag).

As described above, in case alf_cu_control_flag is 1, the encoder and decoder may determine whether apply an ALF to the current CU depending on the ALF flag (for example, alf_cu_flag, hereinafter referred to as alf_cu_flag). At this time, the encoder may assign 0 to alf_cu_flag for the CU encoded in the I_PCM mode and may send it to the decoder. In such case, the decoder may skip the ALF process on the CU encoded in the I_PCM mode by determining whether to apply an ALF depending on the alf_cu_flag value, for example. As another example, in case alf_cu_control_flag is 1, the encoder and decoder may disregard the alf_cu_flag value for the CU encoded in the I_PCM mode, omitting the ALF process.

In case alf_cu_control_flag is 0, the CU corresponding to alf_cu_control_flag might not have ALF flag information. That is, in such case, there might not be per-CU on-off information on the ALF. At this time, the encoder and decoder may skip the ALF process by inferring the alf_cu_flag value as 0 for the CU encoded in the I_PCM mode.

Referring back to FIG. 5, in case an ALF process is determined to be carried out, the encoder and decoder may perform adaptive loop filtering on a pixel in the reconstructed image (S520). Here, the reconstructed image may correspond to an image obtained after deblocking filtering and/or SAO process have been performed. As described above, the adaptive loop filter (ALF) may adaptively apply a Wiener filter to the reconstructed image after deblocking filtering and/or SAO process have been performed.

An adaptive loop filter (and/or Wiener filter) applied to the pixel in the reconstructed image may be determined based on the filter shape and filter coefficient. That is, the encoder and decoder may fulfil adaptive loop filtering based on the filter shape and filter coefficient.

The encoder may determine a filter shape and/or filter coefficient through a predetermined process. As described above, the adaptive loop filter is applied to minimize errors that may occur during a compression encoding process, and the encoder may determine a filter shape and/or filter coefficient that allows for minimized errors. For example, error values (for example, difference values) may exist on a per-pixel basis between the original image and the reconstructed image that has undergone an adaptive loop filter. At this time, the filter shape and/or filter coefficient may be determined to minimize the value obtained by summing the squares of the error values. Information on the determined filter shape and/or filter coefficient may be transmitted to the decoder through a slice header, and the decoder may determine the filter shape and/or filter coefficient that are used for adaptive loop filtering based on the received information.

Meanwhile, in an embodiment, the encoder and decoder may select one of a plurality of predetermined filter shapes in performing adaptive loop filtering. In other words, the encoder and decoder may select one filter shape from a predetermined filter shape set including a plurality of filter shapes and may perform adaptive loop filtering based on the selected filter shape. The number of the filter shapes included in the filter shape set may be, e.g., 2. The encoder, after the filter shape is determined, may send, to the decoder, information indicating which filter shape is used among the plurality of predetermined filter shapes. The decoder may select one filter shape among the plurality of predetermined filter shapes based on the received information and may perform adaptive loop filtering based on the selected filter shape.

Upon selection of a filter shape, one of a block-based adaptation and a region-based adaptation may be used. In case the block-based adaptation is used, the encoder and/or decoder may choose one of the plurality of predetermined filter shapes per block, based on the variation and directivity of the pixel value. In case the region-based adaptation is used, the encoder and/or decoder may select one of the plurality of predetermined filter shapes per partitioned image region.

In another embodiment, the encoder and decoder may use a predetermined unified filter shape (hereinafter, referred to as a unified filter shape) in a fixed manner, when performing adaptive loop filtering. In case the unified filter shape is used, the encoder and decoder do not need to separately determine a filter shape, and thus, a process of determining a filter shape may be skipped. The encoder need not separately send information on a filter shape to the decoder.

In case adaptive loop filtering is fulfilled based on one selected from among a plurality of filter shapes, various image features may be reflected better, so that the optimal filtering may be possible. However, use of a plurality of filter shapes may cause the encoder and/or decoder to be more complicated. For example, assume that one selected from two types of filter shapes is used to perform adaptive loop filtering. Here, the filter shape used for adaptive loop filter may be determined at a slice level. In this case, the encoder should perform a two-pass process on one slice in order to determine an optimal filter shape, thus leading to more complexity. Accordingly, in order to reduce complexity while maintaining filtering performance, the encoder and decoder may perform adaptive loop filtering based on the above-described unified filter shape.

Meanwhile, the encoder and decoder may apply the same filter shape to the luma component and chroma component in performing adaptive loop filter. However, the filter shape applied to the luma component and the filter shape applied to the chroma component may be each determined independently from each other.

In an embodiment, the encoder and decoder may apply the filter shape used for the luma component to the chroma component in the same manner, and in such case, the adaptive loop filter applied to the luma component and the adaptive loop filter applied to the chroma component may have the same filter shape. That is, the encoder and decoder may use the filter shape applied to the luma component as the filter shape of the chroma component. By way of example, the encoder and decoder may select one filter shape from a predetermined filter shape set including a plurality of filter shapes and may perform adaptive loop filtering on the luma component based on the selected filter shape. Further, the selected filter shape may apply likewise to the chroma component, and thus, the encoder and decoder may perform adaptive loop filtering on the chroma component based on the same filter shape as the filter shape applied to the luma component. As another example, even in case a predetermined unified filter shape is used, the encoder and decoder may perform adaptive loop filtering on the chroma component based on the same filter shape as the filter shape applied to the luma component.

In another embodiment, the encoder may separately derive a filter shape for the luma component and a filter shape for the chroma component and may send them to the decoder. At this time, the decoder may perform adaptive loop filtering on the luma component based on the filter shape corresponding to the luma component and perform adaptive loop filter on the chroma component based on the filter shape corresponding to the chroma component. In such case, the decoder may separately apply a filter shape to each of the luma component and the chroma component.

In still another embodiment, a filter shape corresponding to the chroma component may be derived in the same manner by a predetermined process in the encoder and decoder. In this case, the encoder and decoder may perform adaptive loop filtering on the chroma component based on the derived filter shape.

Specific embodiments of the filter shape used for adaptive loop filtering are described below.

Figure 6:
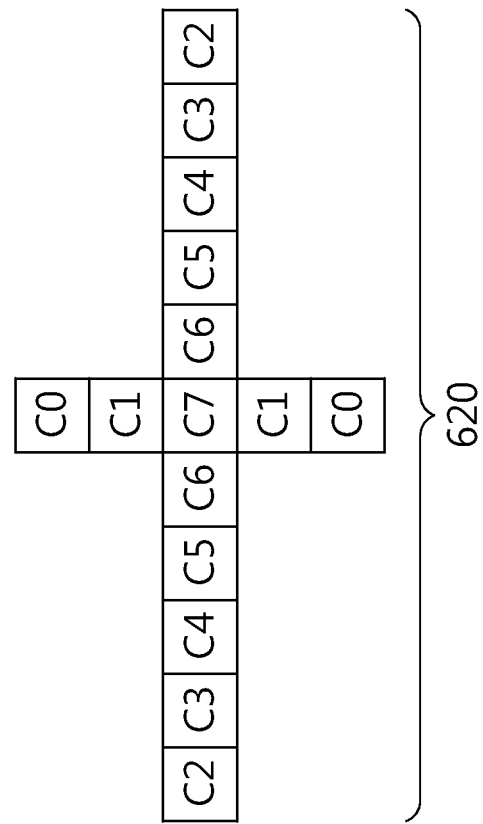
FIG. 6 is a view illustrating an embodiment of a filter shape applied to an adaptive loop filter.
Figure 6:
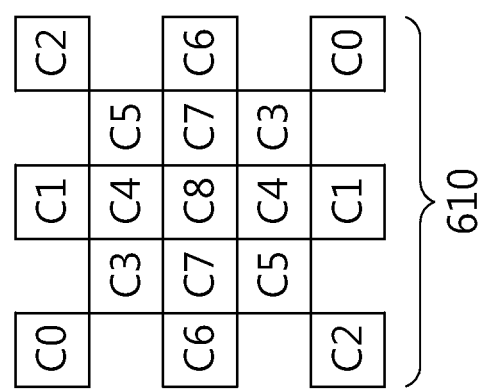

FIG. 6 is a view illustrating an embodiment of a filter shape applied to an adaptive loop filter.

As described above, the encoder and decoder may pick up one among a plurality of predetermined filter shapes in performing adaptive loop filtering. That is, the encoder and decoder may select one filter shape from a predetermined filter shape set including a plurality of filter shapes, and based on the selected filter shape, may perform adaptive loop filtering. As an example, the filter shape set may include two types of filter shapes. FIG. 6 shows an embodiment of two types of filter shapes included in a filter shape set.

Meanwhile, an adaptive loop filter may be assigned a filter coefficient depending on a filter shape. Hereinafter, as used herein, the position and/or unit of assigning each filter coefficient to an adaptive loop filter is referred to as a filter tab. At this time, each filter tab may be assigned one filter coefficient, and the form in which filter tabs are arranged may correspond to a filter shape.

Further, as used herein, the filter tab positioned at the center of a filter shape is referred to as a center filter tab. Further, a filter tab positioned adjacent to a left side of the center filter tab is referred to as a first left filter tab, a filter tab positioned adjacent to an upper end of the center filter tab as a first upper filter tab, a filter tab positioned adjacent to a right side of the center filter tab as a first right filter tab, a filter tab positioned adjacent to a lower end of the center filter tab as a first lower filter tab. A filter tab positioned closest to a left and upper corner of the center filter tab is referred to as a first left upper filter tab, a filter tab positioned closest to a right upper corner of the center filter tab as a first right upper filter tab, a filter tab positioned closest to a right lower corner of the center filter tab as a first right lower filter tab, and a filter tab positioned closest to a left lower corner of the center filter tab as a first left lower filter tab.

Further, as used herein, a filter tab positioned adjacent to a left side of an nth left filter tab is referred to as an n+1th left filter tab, a filter tab positioned adjacent to an upper end of an nth upper filter tab as an n+1th upper filter tab, a filter tab positioned adjacent to a right side of an nth right filter tab as an n+1th right filter tab, and a filter tab positioned adjacent to a lower end of an nth lower filter tab as an n+1th lower filter tab. A filter tab positioned closest to a left upper corner of an nth left upper filter tab is referred to as an n+1th left upper filter tab, a filter tab positioned closest to a right upper corner of an nth right upper filter tab as an n+1th right upper filter tab, a filter tab positioned closest to a right lower corner of an nth right lower filter tab as an n+1th right lower filter tab, and a filter tab positioned closest to a left lower corner of an nth left lower filter tab as an n+1th left lower filter tab. Here, n is a natural number.

Referring to 610 of FIG. 6, among the filter shapes included in the filter shape set, one may be shaped as a 5×5 star. In the 5×5 star filter shape, 9 filter tabs may be arranged in the form of a 3×3 square around the center filter tab C8 that is positioned at the center of the filter shape.

Hereinafter, the square shape positioned at the center of the filter shape around the center filter tab is referred to as a center square. Further, a center square having an N×N size is referred to as an N×N center square (N is a natural number not less than 3). For example, a 3×3 center square may comprise a center filter tab, a first left filter tab, a first left upper filter tab, a first upper filter tab, a first right upper filter tab, a first right filter tab, a first right lower filter tab, a first lower filter tab, and a first left lower filter tab.

The 5×5 star filter shape may comprise a second left filter tab, a second left upper filter tab, a second upper filter tab, a second right upper filter tab, a second right filter tab, a second right lower filter tab, a second lower filter tab, and a second left lower filter tab, in addition to the 3×3 center square.

Hereinafter, like the filter shape shown in 610 of FIG. 6, a filter shape comprising a 3×3 center square, a second left filter tab, a second left upper filter tab, a second upper filter tab, a second right upper filter tab, a second right filter tab, a second right lower filter tab, a second lower filter tab, and a second left lower filter tab is referred to as a 5×5 star filter shape.

Referring to 620 of FIG. 6, among the filter shapes included in the filter shape set, another may have an 11×5 cross shape. The 11×5 cross filter shape may have a cross shape with a symmetrical structure with respect to the center filter tab C7. Further, in the 11×5 cross filter shape, 11 filter tabs are arranged along the horizontal direction, and five filter tabs may be arranged along the vertical direction. Here, the 11 horizontally arranged filter tabs may include a center filter tab, a first left filter tab, a second left filter tab, a third left filter tab, a fourth left filter tab, a fifth left filter tab, a first right filter tab, a second right filter tab, a third right filter tab, a fourth right filter tab, and a fifth right filter tab. The five vertically arranged filter tabs may include a center filter tab, a first upper filter tab, a second upper filter tab, a first lower filter tab, and a second lower filter tab.

Hereinafter, the "cross shape" means a cross shape having central symmetry with respect to the center filter tab. Further, the cross shape in which A filter tabs are arranged horizontally and B filter tabs are arranged vertically is referred to as an A×B cross shape (A and B are natural numbers). At this time, the horizontal size of the A×B cross shape may be A, and the vertical size of the A×B cross shape may be B.

Meanwhile, in 610 and 620 of FIG. 6, the letter marked at each filter tab refers to a filter coefficient assigned to each filter tab. In FIG. 6, the filter coefficients may be assigned in the form of central symmetry with respect to the center filter tab. In other words, two filter tabs present at the positions symmetrical to each other with respect to the center filter tab may be assigned with the same filter coefficient.

Referring to 610 of FIG. 6, the filter coefficient assigned to the second left upper filter tab is C0. Further, the second right lower filter tab is located at the position symmetrical with the second left upper filter tab with respect to the position of the center filter tab, and the second right lower filter tab may be also assigned with the same filter coefficient, C0. Further, the other filter coefficients (C1 to C7) than the filter coefficient (C8) assigned to the center filter tab may be similarly assigned to two filter tabs present at their corresponding positions with respect to the center filter tab.

In 610 of FIG. 6, the 5×5 star filter shape includes 17 filter tabs. However, since the filter coefficients, C0 to C7, are assigned in the central symmetry, all of the 17 filter tabs may be assigned only with the nine filter coefficients including C8. At this time, the encoder may send, to the decoder, only nine filter coefficients, not 17 filter coefficients, for one 5×5 star filter shape. In such case, accordingly, the amount of information transferred from the encoder to the decoder may be reduced.

Further, referring to 620 of FIG. 6, the filter coefficient assigned to the second upper filter tab is C0. Further, since the second lower filter tab is positioned symmetrical to the second upper filter tab with respect to the position of the center filter tab, the second lower filter tab may also be assigned filter coefficient, C0. Further, the other filter coefficients (C1 to C6) than the filter coefficient (C7) assigned to the center filter tab may be likewise assigned to two filter tabs present at their corresponding positions with respect to the center filter tab.

In 620 of FIG. 6, the 11×5 cross filter shape Includes 15 filter tabs. However, since the filter coefficients, C0 to C6, are assigned in the central symmetry, all of the 15 filter tabs may be assigned only with the eight filter coefficients including C7. At this time, the encoder may send, to the decoder, only nine filter coefficients, not 15 filter coefficients, for one 11×5 cross filter shape. Accordingly, in such case, like 610 of FIG. 6, the amount of information transferred from the encoder to the decoder may be decreased.

Meanwhile, among the above-described two-type filter shapes, the 5×5 star filter shape shown in 610 of FIG. 6 has a relatively center-concentrated form. Accordingly, the 5×5 star filter shape may apply when pixels having higher correlation with a pixel to be filtered are relatively concentrated around the to-be-filtered pixel. In contrast, the 11×5 cross filter shape shown in 620 of FIG. 6 has a form of being relatively widely spread in upper and lower and/or left and right directions. Accordingly, the 11×5 cross filter shape may apply when pixels having higher correlation with a pixel to be filtered are relatively dispersed in upper and lower and/or left and right directions. An example of such case may include, e.g., when the image to which the to-be-filtered pixel belongs has a large movement in the upper and lower and/or left and right directions.

Hereinafter, a filter shape having a center-concentrated form, like the 5×5 star filter shape, is referred to as a centralized filter shape. Further, a filter shape that is not the centralized filter shape, like the 11×5 cross filter shape, is referred to as a non-centralized filter shape.

Figure 7:
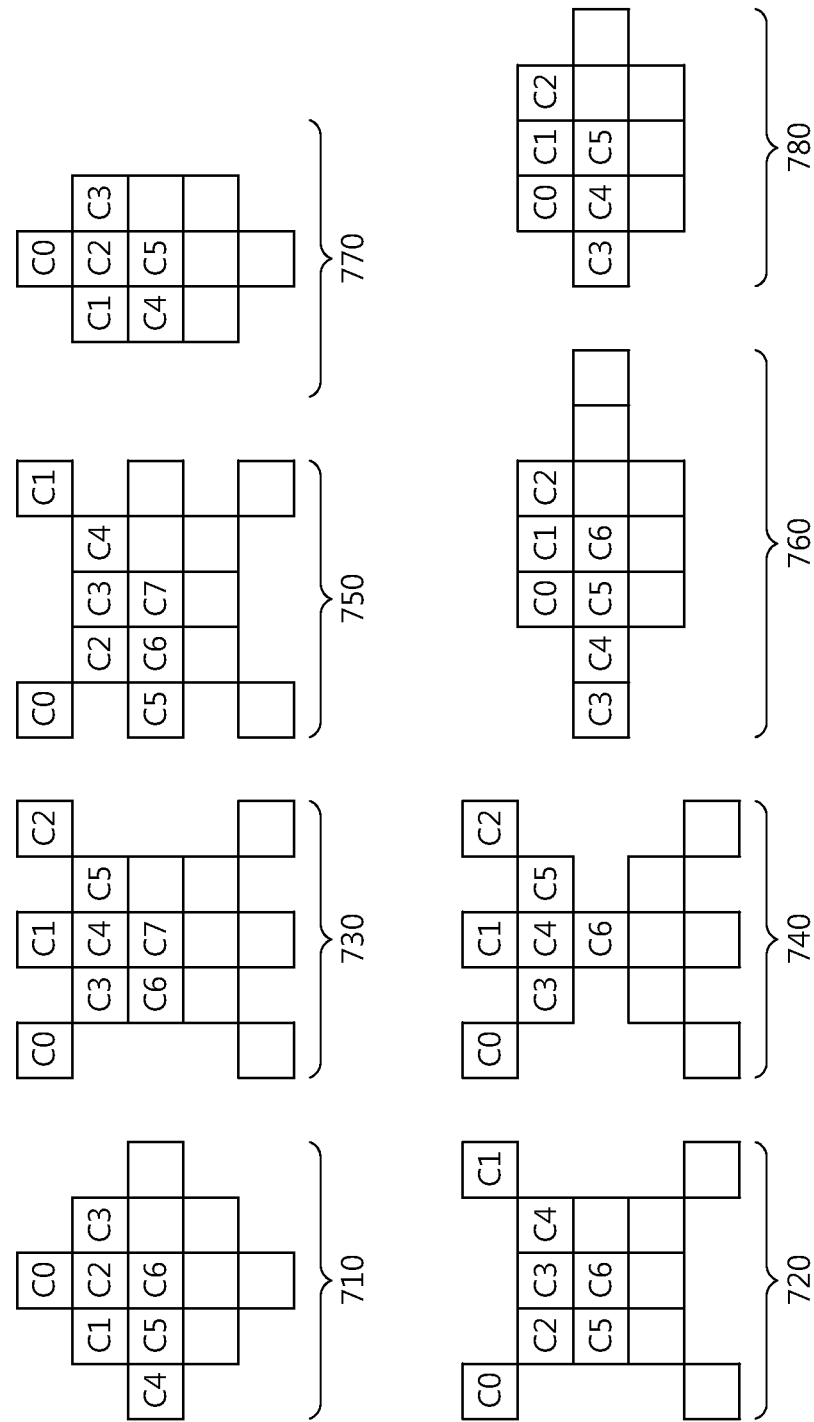
FIG. 7 is a view illustrating embodiments of a centralized filter shape applied to an adaptive loop filter.

FIG. 7 is a view illustrating embodiments of a centralized filter shape applied to an adaptive loop filter.

As described above, the encoder and decoder may choose one filter shape from a predetermined filter shape set Including a plurality of filter shapes. At this time, the encoder and decoder may perform adaptive loop filtering based on the chosen filter shape.

Meanwhile, in the embodiment described above in connection with FIG. 6, the two types of filter shapes included in the filter shape set are a 5×5 star filter shape and a 11×5 cross filter shape. Here, the 5×5 star filter shape, a centralized filter shape, uses nine filter coefficients C0 to C8 and the 11×5 cross filter shape uses eight filter coefficients C0 to C7. The number of filter coefficients may significantly affect, e.g., filtering performance and encoding time. Accordingly, complexity needs to be reduced by decreasing the number of filter coefficients while maximally maintaining the filtering performance. For this purpose, a new centralized filter shape may be provided, which differs from the 5×5 star filter shape shown in 610 of FIG. 6.

FIG. 7 shows embodiments of a centralized filter shape. The letter marked at each filter tab in FIG. 7 denotes a filter coefficient assigned to each filter tab. The filter coefficients, like in the embodiment described above in connection with FIG. 6, may be assigned in the central symmetry with respect to the center filter tab. That is, the same filter coefficient may be allotted to two filter tabs present at the positions symmetrical to each other with respect to the center filter tab.

Accordingly, in each of the filter shapes shown in FIG. 7, among two filter tabs present at the positions symmetrical to each other with respect to the center filter tab, only the filter tab positioned relatively at a left side and/or upper end may be marked a filter coefficient. The filter tab that is not marked with a filter coefficient in FIG. 7 may be assigned the filter coefficient that is assigned to the filter tab positioned symmetrical thereto with respect to the center filter tab.

710 of FIG. 7 shows an embodiment of a centralized filter shape. The filter shape shown in 710 of FIG. 7 may correspond to a filter shape that excludes the second left upper filter tab, the second right upper filter tab, the second right lower filter tab, and the second left lower filter tab from the 5×5 star filter shape. In other words, the filter shape may comprise a 3×3 center square consisting of nine filter tabs, the second left filter tab, the second upper filter tab, the second right filter tab, and the second lower filter tab.

While the 5×5 star filter shape uses nine filter coefficients, the filter shape shown in 710 of FIG. 7 uses seven filter coefficients C0 to C6. At this time, the encoder may determine only seven filter coefficients, not nine filter coefficients, and may send them to the decoder. Accordingly, since the filter shape shown in 710 of FIG. 7 uses relatively fewer filter coefficients, encoding time and complexity may be reduced.

720 of FIG. 7 shows another embodiment of a centralized filter shape. The filter shape shown in 720 of FIG. 7 may correspond to a filter shape that excludes the second left filter tab, the second upper filter tab, the second right filter tab, and the second lower filter tab from the 5×5 star filter shape. That is, the filter shape may comprise a 3×3 center square consisting of nine filter tabs, the second left upper filter tab, the second right upper filter tab, the second right lower filter tab, and the second left lower filter tab.

While the 5×5 star filter shape uses nine filter coefficients, the filter shape shown in 720 of FIG. 7 uses seven filter coefficients C0 to C6. At this time, the encoder may determine only seven filter coefficients, not nine filter coefficients, and may send them to the decoder. Accordingly, since the filter shape shown in 720 of FIG. 7 uses relatively fewer filter coefficients, encoding time and complexity may be reduced.

730 of FIG. 7 shows still another embodiment of a centralized filter shape. The filter shape shown in 730 of FIG. 7 may correspond to a filter shape that excludes the second left filter tab and the second right filter tab from the 5×5 star filter shape. That is, the filter shape may comprise a 3×3 center square consisting of nine filter tabs, the second left upper filter tab, the second upper filter tab, the second right upper filter tab, the second right lower filter tab, the second lower filter tab, and the second left lower filter tab.

While the 5×5 star filter shape uses nine filter coefficients, the filter shape shown in 730 of FIG. 7 uses eight filter coefficients C0 to C7. At this time, the encoder may determine only eight filter coefficients, not nine filter coefficients, and may send them to the decoder. Accordingly, since the filter shape shown in 730 of FIG. 7 uses relatively fewer filter coefficients, encoding time and complexity may be reduced.

740 of FIG. 7 shows still another embodiment of a centralized filter shape. The filter shape shown in 740 of FIG. 7 may correspond to a filter shape that excludes the first left filter tab, the second left filter tab, the first right filter tab, and the second right filter tab from the 5×5 star filter shape. That is, the filter shape may comprise the center filter tab, the first left upper filter tab, the second left upper filter tab, the first upper filter tab, the second upper filter tab, the first right upper filter tab, the second right upper filter tab, the first right lower filter tab, the second right lower filter tab, the first lower filter tab, the second lower filter tab, the first left lower filter tab, and the second left lower filter tab.

While the 5×5 star filter shape uses nine filter coefficients, the filter shape shown in 740 of FIG. 7 uses seven filter coefficients C0 to C6. At this time, the encoder may determine only seven filter coefficients, not nine filter coefficients, and may send them to the decoder. Accordingly, the filter shape shown in 740 of FIG. 7 uses relatively fewer filter coefficients, encoding time and complexity may be reduced.

750 of FIG. 7 shows still another embodiment of a centralized filter shape. The filter shape shown in 750 of FIG. 7 may correspond to a filter shape that excludes the second upper filter tab and the second lower filter tab from the 5×5 star filter shape. That is, the filter shape may comprise a 3×3 center square consisting of nine filter tabs, the second left filter tab, the second left upper filter tab, the second right upper filter tab, the second right filter tab, the second right lower filter tab, and the second left lower filter tab.

While the 5×5 star filter shape uses nine filter coefficients, the filter shape shown in 750 of FIG. 7 uses eight filter coefficients C0 to C7. At this time, the encoder may determine only eight filter coefficients, not nine filter coefficients, and may send them to the decoder. Accordingly, since the filter shape shown in 750 of FIG. 7 uses relatively fewer filter coefficients, encoding time and complexity may be reduced.

760 of FIG. 7 shows yet still another embodiment of a centralized filter shape. The filter shape shown in 760 of FIG. 7 may comprise a 3×3 center square consisting of nine filter tabs, the first left filter tab, the second left filter tab, the first right filter tab, and the second right filter tab.

While the 5×5 star filter shape uses nine filter coefficients, the filter shape shown in 760 of FIG. 7 uses seven filter coefficients C0 to C6. At this time, the encoder may determine only seven filter coefficients, not nine filter coefficients, and may send them to the decoder. Accordingly, since the filter shape shown in 760 of FIG. 7 uses relatively fewer filter coefficients, encoding time and complexity may be reduced.

770 of FIG. 7 shows yet still another embodiment of a centralized filter shape The filter shape shown in 770 of FIG. 7 may correspond to a filter shape that excludes the second left filter tab, the second left upper filter tab, the second right upper filter tab, the second right filter tab, the second right lower filter tab, and the second left lower filter tab from the 5×5 star filter shape. That is, the filter shape may comprise a 3×3 center square consisting of nine filter tabs, the second upper filter tab, and the second lower filter tab.

While the 5×5 star filter shape uses nine filter coefficients, the filter shape shown in 770 of FIG. 7 uses six filter coefficients C0 to C5. At this time, the encoder may determine only six filter coefficients, not nine filter coefficients, and may send them to the decoder. Accordingly, since the filter shape shown in 770 of FIG. 7 uses relatively fewer filter coefficients, encoding time and complexity may be reduced.

780 of FIG. 7 shows yet still another embodiment of a centralized filter shape. The filter shape shown in 780 of FIG. 7 may correspond to a filter shape that excludes the second left upper filter tab, the second upper filter tab, the second right upper filter tab, the second right lower filter tab, the second lower filter tab, and the second left lower filter tab from the 5×5 star filter shape. That is, the filter shape may comprise a 3×3 center square consisting of nine filter tabs, the second left filter tab, and the second right filter tab.

While the 5×5 star filter shape uses nine filter coefficients, the filter shape shown in 780 of FIG. 7 uses six filter coefficients C0 to C5. At this time, the encoder may determine only six filter coefficients, not nine filter coefficients, and may send them to the decoder. Accordingly, since the filter shape shown in 780 of FIG. 7 uses relatively fewer filter coefficients, encoding time and complexity may be reduced.

Figure 8:
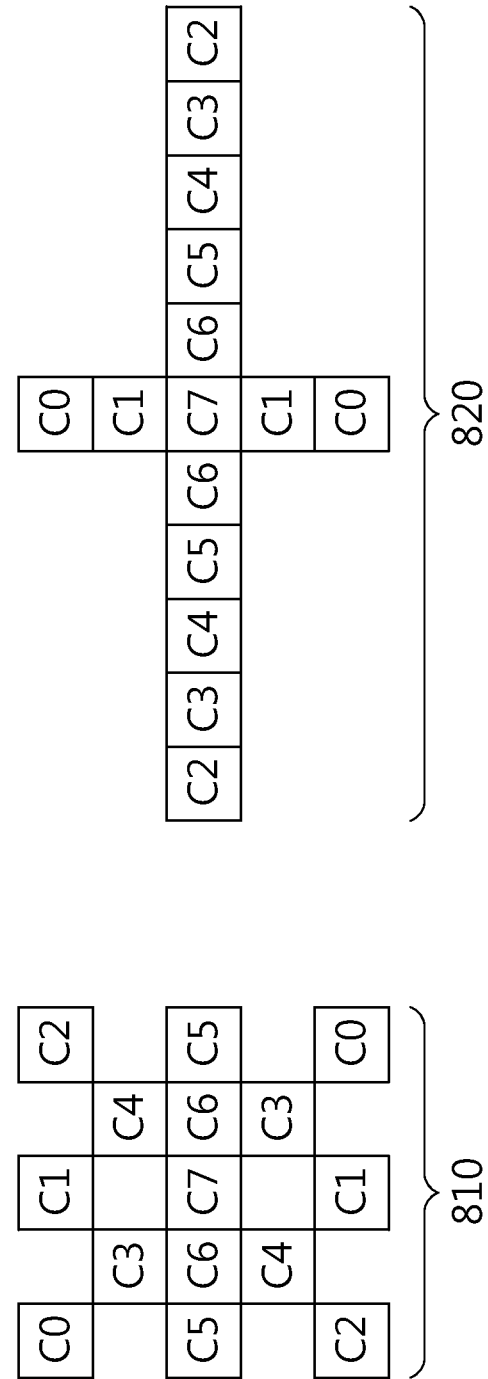
FIG. 8 is a view illustrating another embodiment of a filter shape applied to an adaptive loop filter.

FIG. 8 is a view illustrating another embodiment of a filter shape applied to an adaptive loop filter.

As described above, the encoder and decoder may choose one filter shape from a predetermined filter shape set including a plurality of filter shapes. At this time, the encoder and decoder may perform adaptive loop filtering based on the chosen filter shape.

Meanwhile, the two types of filter shapes included in the filter shape set, in the embodiment described above in connection with FIG. 6 are a 5×5 star filter shape and a 11×5 cross filter shape. Here, the 5×5 star filter shape, a centralized filter shape, uses nine filter coefficients C0 to C8, and the 11×5 cross filter shape uses eight filter coefficients C0 to C7. Accordingly, in the embodiment described above in connection with FIG. 6, the number of filter coefficients used may vary depending on the filter shape applied to the adaptive loop filter. In such case, there may be the burden of being supposed to consider the number of variable filter coefficients in the adaptive loop filtering process. Such issue may be addressed by rendering the number of filter coefficients used for the centralized filter shape consistent with the number of filter coefficients used for the non-centralized filter shape.

Further, as described above in connection with FIG. 7, the number of filter coefficients may have a significant influence on the filtering performance and encoding time. Accordingly, complexity needs to be reduced by decreasing the number of filter coefficients while maximally maintaining filtering performance.

810 of FIG. 8 shows an embodiment of a centralized filter shape. The filter shape shown in 810 of FIG. 8 may correspond to a filter shape that excludes the first upper filter tab and the first lower filter tab from the 5×5 star filter shape. That is, the filter shape may comprise the center filter tab, the first left filter tab, the second left filter tab, the first left upper filter tab, the second left upper filter tab, the second upper filter tab, the first right upper filter tab, the second right upper filter tab, the first right filter tab, the second right filter tab, the first right lower filter tab, the second right lower filter tab, the second lower filter tab, the first left lower filter tab, and the second left lower filter tab. 820 of FIG. 8 shows an embodiment of a non-centralized filter shape. The filter shape shown in 820 of FIG. 8 may correspond to the 11×5 cross filter shape. The filter shape is identical to the filter shape shown in 620 of FIG. 6 and detailed description thereof is skipped.

The letter marked at each filter tab in 810 and 820 of FIG. 8 denotes a filter coefficient assigned to each filter tab. The filter coefficients in FIG. 8 may be assigned in the central symmetry with respect to the center filter tab. In other words, the two filter tabs present at the positions symmetrical to each other with respect to the center filter tab may be assigned the same filter coefficient.

Referring to 810 of FIG. 8, the centralized filter shape may use eight filter coefficients C0 to C7. In such case, fewer filter coefficients than the number of filter coefficients (for example, nine) used for the 5×5 star filter shape are used, and thus, complexity may be reduced. Further, referring to 820 of FIG. 8, the non-centralized filter shape (11×5 cross filter shape) may use eight filter coefficients C0 to C7. Accordingly, the number of filter coefficients used for the filter shape shown in 810 of FIG. 8 is the same as the number of filter coefficients used for the filter shape shown in 820 of FIG. 8. In such case, since the number of filter coefficients used for adaptive loop filtering is always constant, as eight, and thus, the encoder and decoder may perform filtering without considering a change in the number of filter coefficients.

Figure 9:
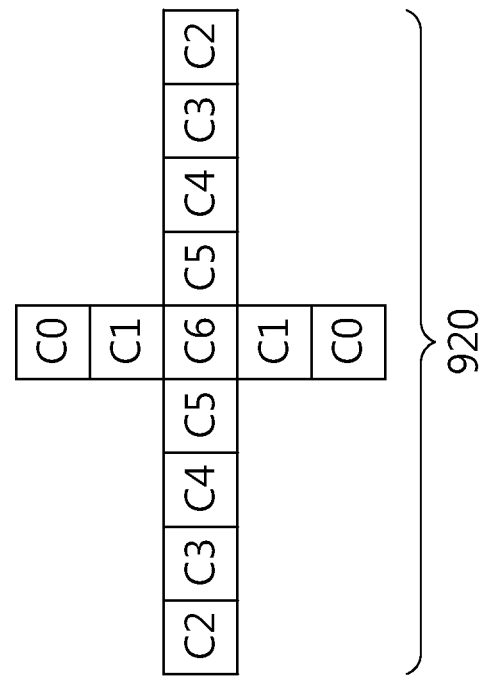
FIG. 9 is a view illustrating another embodiment of a filter shape applied to an adaptive loop filter.
Figure 9:
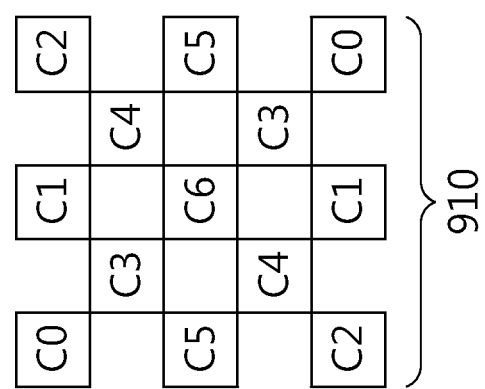

FIG. 9 is a view illustrating another embodiment of a filter shape applied to an adaptive loop filter.

910 of FIG. 9 shows an embodiment of a centralized filter shape. The filter shape shown in 910 of FIG. 9 may correspond to a filter shape that excludes the first left filter tab, the first upper filter tab, the first right filter tab, and the first lower filter tab from the 5×5 star filter shape. That is, the filter shape may comprise the center filter tab, the second left filter tab, the first left upper filter tab, the second left upper filter tab, the second upper filter tab, the first right upper filter tab, the second right upper filter tab, the second right filter tab, the first right lower filter tab, the second right lower filter tab, the second lower filter tab, the first left lower filter tab, and the second left lower filter tab.

920 of FIG. 9 shows an embodiment of a non-centralized filter shape. Referring to 920 of FIG. 9, the non-centralized filter shape may correspond to a 9×5 cross filter shape. The 9×5 cross filter shape has a cross shape that has a central symmetric structure with respect to the center filter tab C6. Further, in the 9×5 cross filter shape, nine filter tabs may be arranged along the horizontal direction, and five filter tabs may be arranged along the vertical direction. Here, the nine filter tabs arranged along the horizontal direction may include a center filter tab, a first left filter tab, a second left filter tab, a third left filter tab, a fourth left filter tab, a first right filter tab, a second right filter tab, a third right filter tab, and a fourth right filter tab. Further, the five filter tabs arranged along the vertical direction may include a center filter tab, a first upper filter tab, a second upper filter tab, a first lower filter tab, and a second lower filter tab.

The letter marked at each filter tab in 910 and 920 of FIG. 9 denotes a filter coefficient assigned to each filter tab. The filter coefficients in FIG. 9 may be assigned in the central symmetry with respect to the center filter tab. That is, the two filter tabs present at the positions symmetrical to each other with respect to the center filter tab may be assigned the same filter coefficient.

Referring to 910 of FIG. 9, the centralized filter shape may use seven filter coefficients C0 to C6. Referring to 920 of FIG. 9, the non-centralized filter shape may use seven filter coefficients C0 to C6. Accordingly, the number of filter coefficients used for the filter shape shown in 910 of FIG. 9 is the same as the number of filter coefficients used for the filter shape shown in 920 of FIG. 9. In this case, since the number of filter coefficients used for adaptive loop filtering is always constant, as 7, the encoder and decoder may perform filtering without considering a change in the number of filter coefficients.

Further, while the embodiment described above in connection with FIG. 8 uses eight filter coefficients, the filter shape shown in FIG. 9 uses seven filter coefficients. Accordingly, since the embodiment described above in connection with FIG. 9 uses relatively fewer filter coefficients, complexity may be reduced.

The filter shapes shown in FIGS. 7 to 9 may correspond to filter shapes simplified as compared with the filter shape shown in FIG. 6. That is, the filter shapes shown in FIGS. 7 to 9 use fewer filter coefficients than the filter shape shown in FIG. 6. As such, the simplified filter shapes may be selectively applied to only one of the luma component and chroma component.

For example, assume that upon adaptive loop filtering, the filter shape set shown in FIG. 6 is used for the luma component. At this time, not the filter shape set shown in FIG. 6, one of the filter shape set described above in connection with FIGS. 7, 8, and 9, may be applicable to the chroma component. As another example, assume that upon adaptive loop filtering, the filter shape set shown in FIG. 6 is used for the chroma component. At this time, not the filter shape set shown in FIG. 6, one of the filter shape sets described above in connection with FIGS. 7, 8, and 9 may be applicable to the luma component.

Figure 10:
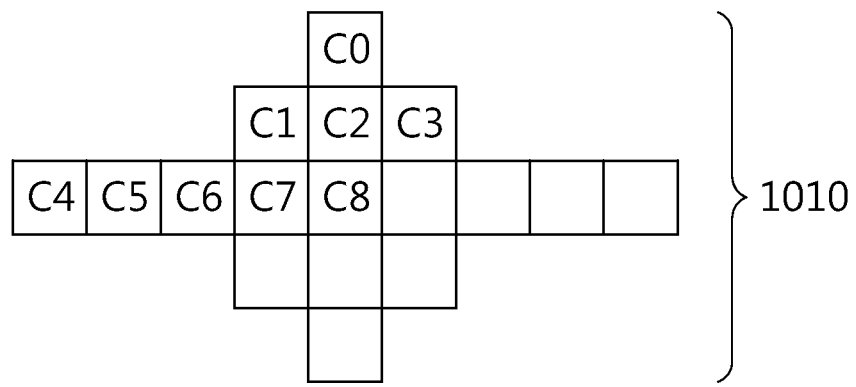
FIG. 10 is a view illustrating another embodiment of a filter shape applied to an adaptive loop filter.
Figure 10:
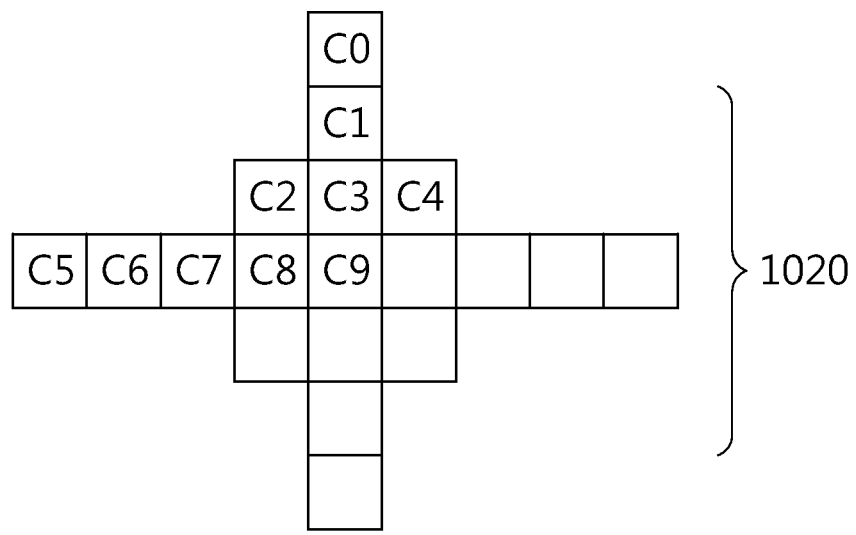
Figure 10:
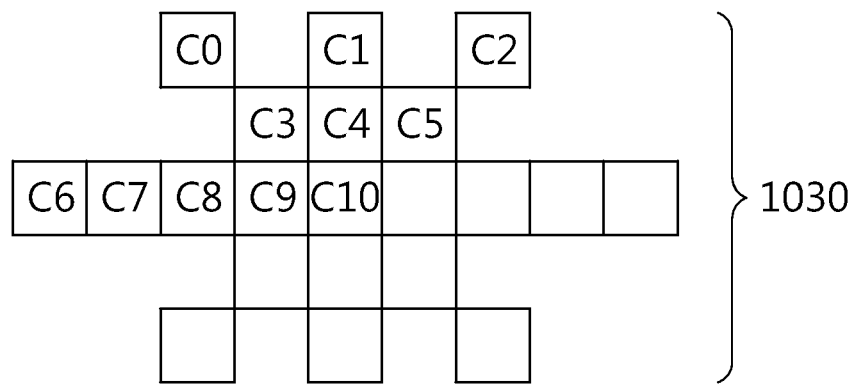

FIG. 10 is a view illustrating another embodiment of a filter shape applied to an adaptive loop filter.

As described above, the encoder and decoder may select one filter shape from a predetermined filter shape set including a plurality of filter shapes. In this case, adaptive loop filtering may be performed based on the selected filter shape. However, the encoder and decoder may use only a predetermined unified filter shape when performing adaptive loop filtering.

In case adaptive loop filtering is performed based on one selected from the plurality of filter shapes, various image characteristics may be reflected better, thus enabling the optimal filtering. However, use of a plurality of filter shapes may cause complexity in the encoder and decoder to be increased. For example, assume that one selected among two types of filter shapes is used to perform adaptive loop filtering. Here, the filter shape used for adaptive loop filtering may be determined at a slice level. In this case, the encoder needs to perform a two-pass process on one slice in order to determine the optimal filter shape, thus leading to an increase in complexity. Accordingly, to reduce complexity while maintaining filtering performance, the encoder and decoder may carry out adaptive loop filtering based on the above-described unified filter shape.

In an embodiment, the unified filter shape may have a cross shape with a center square, i.e., a filter shape in which a center square and a cross overlap each other. Here, the center square may mean a square shape that is positioned at the center of the filter shape around the center filter tab, and the cross may mean a cross shape having central symmetry with respect to the center filter tab.

In this case, the vertical size of the cross may be larger than the vertical size of the center square, and the horizontal size of the cross may be larger than the horizontal size of the center square. In an example, the center square may be a 3×3 center square having a 3×3 size. At this time, each of the horizontal size and vertical size of the cross may be 5 or more.

Further, the unified filter shape may have a cross filter shape having a 5×5 star, i.e., a filter shape in which a 5×5 star and a cross overlap each other. At this time, each of the horizontal size and the vertical size of the cross may be 5 or more.

Hereinafter, specific embodiments of a unified filter shape are described with reference to the accompanying drawings.

1010, 1020, and 1030 of FIG. 10 each illustrates an embodiment of a unified filter shape. The letter marked at each filter tab in FIG. 10 denotes a filter coefficient assigned to each filter tab. The filter coefficients may be assigned in the central symmetry with respect to the center filter tab. In other words, two filter tabs present at the positions symmetrical to each other with respect to the center filter tab may be assigned the same filter coefficient.

In each of the filter shapes shown in FIG. 10, among the two filter tabs present at the positions symmetrical to each other with respect to the center filter tab, only the filter tab positioned relatively at the left side and/or upper end is marked with a filter coefficient. The filter tab that Is not marked with a filter coefficient in FIG. 10 may be assigned the same filter coefficient as that assigned to the filter tab positioned symmetrical thereto with respect to the center filter tab.

1010 of FIG. 10 shows an embodiment of a unified filter shape. The unified filter shape shown in 1010 of FIG. 10 corresponds to a 9×5 cross filter shape having a 3×3 center square (9×5 cross with 3×3 center square), i.e., a filter shape in which a 3×3 center square and a 9×5 cross overlap each other. That is, the filter shape may comprise a 3×3 center square consisting of nine filter tabs, the second left filter tab, the third left filter tab, the fourth left filter tab, the second upper filter tab, the second right filter tab, the third right filter tab, the fourth right filter tab, and the second lower filter tab.

The filter shape shown in 1010 of FIG. 10 may use nine filter coefficients C0 to C8. Accordingly, the encoder may determine nine filter coefficients and may send them to the decoder. The nine filter coefficients sent may be assigned to the filter tabs, respectively, which are marked with filter coefficients in 1010 of FIG. 10. Further, the filter tab that is not marked with a filter coefficient in 1010 of FIG. 10 may use the filter coefficient sent from the encoder in a symmetrical structure. In other words, the filter coefficient not assigned with a filter coefficient may be assigned the same filter coefficient assigned to the filter tab positioned symmetrical thereto with respect to the center filter tab.

1020 of FIG. 10 shows another embodiment of a unified filter shape. The unified filter shape shown in 1020 of FIG. 10 corresponds to a filter shape having a 9×7 cross filter shape having a 3×3 center square (9×7 cross with 3×3 center square), i.e., a filter shape in which a 3×3 center square and a 9×7 cross overlap each other. That is, the filter shape may comprise a 3×3 center square consisting of nine filter tabs, the second left filter tab, the third left filter tab, the fourth left filter tab, the second upper filter tab, the third upper filter tab, the second right filter tab, the third right filter tab, the fourth right filter tab, the second lower filter tab, and the third lower filter tab.

The unified filter shape shown in 1020 of FIG. 10 may use ten filter coefficients C0 to C9. Accordingly, the encoder may determine 10 filter coefficients and send them to the decoder. The ten filter coefficients sent may be assigned to the filter tabs, respectively, which are marked with the filter coefficients in 1020 of FIG. 10. Further, the filter tab not marked with a filter coefficient in 1020 of FIG. 10 may use the filter coefficient sent from the encoder in a symmetrical structure. In other words, the filter tab not assigned with a filter coefficient may be assigned the same filter coefficient assigned to the filter tab symmetrical thereto with respect to the center filter tab.

1030 of FIG. 10 shows another embodiment of a unified filter shape. The unified filter shape shown in 1030 of FIG. 10 corresponds to a 9×5 cross filter shape having a 5×5 star (9×5 cross with 5×5 star, i.e., a filter shape in which a 5×5 star and a 9×5 cross overlap each other. That is, the filter shape may comprise a 5×5 star consisting of 17 filter tabs, the third left filter tab, the fourth left filter tab, the third right filter tab, and the fourth right filter tab. Here, the 5×5 star, as described above in connection with FIG. 6, may comprise the 3×3 center square, the second left filter tab, the second left upper filter tab, the second upper filter tab, the second right upper filter tab, the second right filter tab, the second right lower filter tab, the second lower filter tab, and the second left lower filter tab.

The unified filter shape shown in 1030 of FIG. 10 may use 11 filter coefficients C0 to C10. Accordingly, the encoder may determine 11 filter coefficients and send them to the decoder. The 11 filter coefficients sent may be assigned to the filter tabs, respectively, which are marked with the filter coefficients in 1030 of FIG. 10. Further, the filter tab not marked with a filter coefficient in 1030 of FIG. 10 may use the filter coefficient sent from the encoder in a symmetrical structure. In other words, the filter tab not marked with a filter coefficient may be assigned the same filter coefficient assigned to the filter tab positioned symmetrical thereto with respect to the center filter tab.

Figure 11:
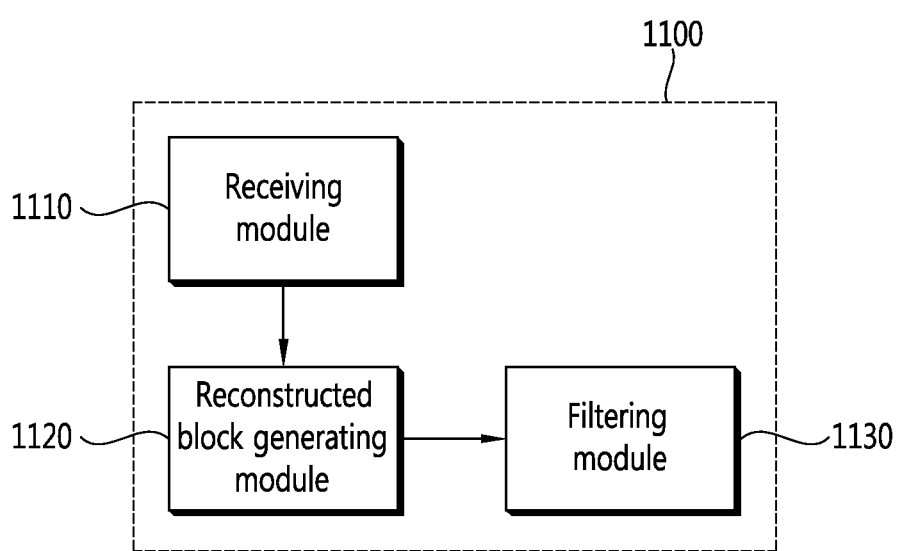
FIG. 11 is a block diagram schematically illustrating an image decoding apparatus according to an embodiment of the present invention.

FIG. 11 is a block diagram schematically illustrating an image decoding apparatus according to the present invention. The image decoding apparatus 1100 according to an embodiment of the present invention may Include a receiving unit 1110, a reconstructed block generating unit 1120, and a filtering unit 1130.

The receiving 1110 may receive a bit stream including image Information from the encoder. Here, the image information may include a plurality of filter coefficients used for adaptive loop filtering.

The reconstructed block generating unit 1120 may generate a reconstructed block on the current block based on the image information received from the encoder. At this time, the reconstructed block generating unit 1120 may perform processes such as entropy decoding, inverse quantization, inverse transform, intra prediction, and/or inter prediction in order to generate a reconstructed block. A specific embodiment of a reconstructed block generating process has been described above in connection with FIG. 3, and detailed description thereof is skipped herein.

The filtering unit 1130 may apply, e.g., a deblocking filter, SAO, and/or adaptive loop filter to the reconstructed block. In particular, the filtering unit 1130 may apply an adaptive loop filter to the reconstructed block that has undergone deblocking filtering and/or SAO process, based on the plurality of filter coefficients included in the image information. A specific embodiment of adaptive loop filtering has been described above, and thus, detailed description thereof is skipped here.

Although in the above-described exemplary embodiments, methods are described based on flowcharts having a series of steps or blocks, the present invention is not limited to the order of the steps, and some steps may be performed in a different order from other steps or simultaneously with the other steps. Further, it may be understood by one of ordinary skill in the art that the steps in the flowcharts do not exclude each other, and rather, other steps may be added thereto or some thereof may be removed therefrom without affecting the scope of the present invention.

Although the present invention has been shown and described with reference to embodiments thereof, it is understood by one of ordinary skill in the art that various changes in form and detail may be made thereto without departing from the scope of the present invention defined by the following claims.

The invention claimed is:
1. A video decoding apparatus, comprising:
an entropy decoder configured to obtain reconstruction information for generating a reconstructed picture and offset information for a sample adaptive offset (SAO) process from a bitstream;
an adder configured to generate the reconstructed picture based on the reconstruction information; and
a filter configured to apply an in-loop filtering process to the reconstructed picture,
wherein for the in-loop filtering process, the filter applies a deblocking filtering process to the reconstructed picture, and applies the SAO process to a sample in the reconstructed picture on which the deblocking filtering process is completed,
wherein the offset information includes offset type information indicating that a band offset type is applied to the sample,
wherein the offset information includes information on n offset values,
wherein the offset information includes explicit band information indicating one of 32 bands as a starting band of a band group consisting of n bands, and an offset value corresponding to a band among the n bands is applied to the sample, wherein n is an integer, and
wherein the offset type information is obtained by context-adaptive arithmetic coding.

2. The video decoding apparatus of claim 1, wherein the offset is applied to the sample based on the offset information which is transmitted for a largest coding unit to which the sample belongs.

3. The video decoding apparatus of claim 1, wherein the band is determined as a predetermined sample value range to which the sample belongs.

4. The video decoding apparatus of claim 1, wherein the n bands are specified as the starting band and following bands according to sample value order,
wherein the offset value is determined based on the band to which the sample belongs.

5. The video decoding apparatus of claim 1, wherein the n is predetermined as a constant value.

6. The video decoding apparatus of claim 1, wherein the band information further indicates a last band among the n bands.

7. A video encoding apparatus, comprising:
an adder configured to generate a reconstructed picture by using prediction samples derived based on a prediction mode;
a filter configured to apply an in-loop filtering process to the reconstructed picture, wherein for the in-loop filtering process, the filter applies a deblocking filtering process to the reconstructed picture, and applies a sample adaptive offset (SAO) process to a sample in the reconstructed picture on which the deblocking filtering process is completed; and
an entropy encoder configured to encoding prediction information on the prediction mode and offset information for the SAO process,
wherein the offset information includes offset type information indicating that a band offset type is applied to the sample,
wherein the offset information includes information on n offset values,
wherein the offset information includes explicit band information indicating one of 32 bands as a starting band of a band group consisting of n bands, and an offset value corresponding to a band among the n bands is applied to the sample, wherein n is an integer, and
wherein the offset type information is encoded by context-adaptive arithmetic coding.

8. The video encoding apparatus of claim 7, wherein the offset is applied to the sample based on the offset information which is transmitted for a largest coding unit to which the sample belongs.

9. The video encoding apparatus of claim 7, wherein the band is determined as a predetermined sample value range to which the sample belongs.

10. The video encoding apparatus of claim 7, wherein the n bands are specified as the starting band and following bands according to sample value order,
wherein the offset value is determined based on the band to which the sample belongs.

11. The video encoding apparatus of claim 7, wherein the n is predetermined as a constant value.

12. The video encoding apparatus of claim 7, wherein the band information further indicates a last band among the n bands.

13. A non-transitory decoder readable storage medium storing a bitstream comprising instruction information causing a decoder to perform the following steps:
obtaining reconstruction information for generating a reconstructed picture and offset information for a sample adaptive offset (SAO) process from a bitstream;
generating the reconstructed picture based on the reconstruction information; and
applying an in-loop filtering process to the reconstructed picture,
wherein applying the in-loop filtering process includes applying a deblocking filtering process to the reconstructed picture, and applying the SAO process to a sample in the reconstructed picture on which the deblocking filtering process is completed,
wherein the offset information includes offset type information indicating that a band offset type is applied to the sample,
wherein the offset information includes information on n offset values,
wherein the offset information includes explicit band information indicating one of 32 bands as a starting band of a band group consisting of n bands, and an offset value corresponding to a band among the n bands is applied to the sample, wherein n is an integer, and
wherein the offset type information is obtained by context-adaptive arithmetic coding.

14. The non-transitory decoder readable storage medium of claim 13, wherein the band is determined as a predetermined sample value range to which the sample belongs.

15. The non-transitory decoder readable storage medium of claim 13, wherein the n bands are specified as the starting band and following bands according to sample value order,
wherein the offset value is determined based on the band to which the sample belongs.

16. The non-transitory decoder readable storage medium of claim 13, wherein the n is predetermined as a constant value.

17. The non-transitory decoder readable storage medium of claim 13, wherein the band information further indicates a last band among the n bands.

* * * * *